US012570835B2

(12) United States Patent
Ashiura et al.

(10) Patent No.: US 12,570,835 B2

(45) Date of Patent: *Mar. 10, 2026

(54) SILANE COUPLING AGENT COMPOSITION AND RUBBER COMPOSITION COMPRISING SAME

(71) Applicant: ENEOS Corporation, Tokyo (JP)

(72) Inventors: Makoto Ashiura, Tokyo (JP); Keisuke Chino, Tokyo (JP); Yusuke Matsuo, Tokyo (JP); Toshiyuki Tsutsumi, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 557 days.

This patent is subject to a terminal disclaimer.

(21) Appl. No.: 18/002,265

(22) PCT Filed: Jun. 4, 2021

(86) PCT No.: PCT/JP2021/021318

§ 371 (c)(1),
(2) Date: Dec. 17, 2022

(87) PCT Pub. No.: WO2021/256295

PCT Pub. Date: Dec. 23, 2021

(65) Prior Publication Data

US 2023/0340231 A1 Oct. 26, 2023

(30) Foreign Application Priority Data

Jun. 18, 2020 (JP) ................................ 2020-105624

(51) Int. Cl.

| | |
|---|---|
| ***C08K 3/36*** | (2006.01) |
| ***B60C 1/00*** | (2006.01) |
| ***C08F 36/08*** | (2006.01) |
| ***C08K 5/21*** | (2006.01) |
| ***C08K 5/31*** | (2006.01) |
| ***C08K 5/54*** | (2006.01) |
| ***C08K 5/548*** | (2006.01) |

(52) U.S. Cl.

CPC ............ *C08K 5/548* (2013.01); *B60C 1/0016* (2013.01); *C08F 36/08* (2013.01); *C08K 3/36* (2013.01); *C08K 2201/014* (2013.01)

(58) Field of Classification Search

CPC ............ C08K 5/548; C08K 3/36; C08F 36/08

USPC ........................................................ 524/262

See application file for complete search history.

(56) References Cited

U.S. PATENT DOCUMENTS

| | | | |
|---|---|---|---|
| 5,534,599 | A | 7/1996 | Sandstrom et al. |
| 2008/0161486 | A1 | 7/2008 | York et al. |
| 2019/0085003 | A1 | 3/2019 | Chino et al. |

FOREIGN PATENT DOCUMENTS

| | | | | |
|---|---|---|---|---|
| JP | H08-259736 A | | 10/1996 | |
| JP | H11-335381 A | | 12/1999 | |
| JP | 2010-514908 A | | 5/2010 | |
| JP | 2014-177429 A | | 9/2014 | |
| JP | 2014-177430 A | | 9/2014 | |
| JP | 2014-177432 A | | 9/2014 | |
| JP | 2014-177578 A | | 9/2014 | |
| JP | 2015-078156 A | | 4/2015 | |
| WO | WO 2016/181679 A1 | | 11/2016 | |
| WO | WO-2017146103 A1 | * | 8/2017 | ............ C09J 201/00 |

(Continued)

OTHER PUBLICATIONS

European Patent Office, Extended Search Report in European Patent Application No. 21826161.8 (Jun. 11, 2024).

(Continued)

*Primary Examiner* — Deve V Hall

(74) *Attorney, Agent, or Firm* — Leydig, Voit & Mayer, Ltd.

(57) ABSTRACT

Provided are: a silane coupling agent composition with which it is possible to obtain a rubber composition having excellent scorch resistance and uncrosslinked compound viscosity; and a crosslinked product of a rubber composition having excellent viscoelastic properties, and a tire using the same which has an excellent balance of wet grip performance and low-fuel consumption. The silane coupling agent composition of the invention includes a silane compound, in which the silane compound includes a first silane compound represented by the following Formula (1) and a second silane compound represented by the following Formula (11):

Formula (1)

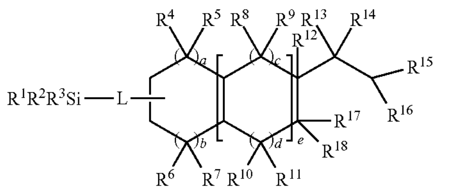

(1)

Formula (11)

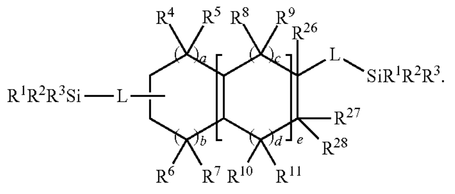

(11)

12 Claims, 7 Drawing Sheets

(56) References Cited

FOREIGN PATENT DOCUMENTS

WO WO 2017/188411 A1 11/2017

OTHER PUBLICATIONS

Japan Patent Office, Office Action in Japanese Patent Application No. 2022-531661 (Nov. 22, 2024).
Japan Patent Office, Office Action in Japanese Patent Application No. 2022-531661 (Apr. 11, 2025).
China National Intellectual Property Administration, Office Action in Chinese Patent Application No. 202180043416.X (Jul. 20, 2023).
Japan Patent Office, International Search Report in International Patent Application No. PCT/JP2021/021318 (Aug. 10, 2021).
Korean Intellectual Property Office, Office Action in Korean Patent Application No. 10-2022-7044212 (Dec. 11, 2024).
Taiwan Intellectul Property Office, Office Action in Taiwanese Patent Application No. 110120404 (Dec. 24, 2024).
Japan Patent Office, International Preliminary Report on Patentability in International Patent Application No. PCT/JP2021/021318 (Dec. 29, 2022).

* cited by examiner

SILANE COUPLING AGENT COMPOSITION AND RUBBER COMPOSITION COMPRISING SAME

BACKGROUND OF THE INVENTION

Technical Field

The present invention relates to a silane coupling agent composition and a rubber composition comprising the same. The present invention also relates to a crosslinked product of the rubber composition and a tire using the rubber composition.

Background Art

Conventionally, a silane compound having a reactive functional group and a hydrolyzable group has been used as a component of a silane coupling agent in order to improve the dispersibility of an organic polymer material such as rubber and an inorganic material such as silica in a rubber composition.

Usually, such a silane compound has a substituent such as a mercapto group, a polysulfide group, an amino group, or an epoxy group as a reactive functional group having high reactivity with an organic polymer material such as rubber and a substituent such as an alkoxysilyl group as a hydrolyzable group having high reactivity with an inorganic material such as silica. For example, Patent Literature 1 discloses a rubber composition containing a polysulfide-based silane coupling agent. In addition, Patent Literature 2 suggests a silane compound having an amino group as a reactive functional group and a methoxy group as a hydrolyzable group.

Further, Patent Literature 3 suggests a rubber composition in which an organic silane compound having a monosulfide bond is compounded to improve scorch resistance of a rubber composition and exothermic properties (viscoelastic properties) of a rubber composition crosslinked product.

CITATION LIST

Patent Literature

Patent Literature 1: Japanese Unexamined Patent Publication H8-259736 (1996)

Patent Literature 2: Japanese Unexamined Patent Publication H11-335381 (1996)

Patent Literature 3: Japanese Unexamined Patent Publication No. 2014-177432

SUMMARY OF THE INVENTION

Technical Problem

However, the reactive functional group of the silane compound suggested in Patent Literature 1 and 2 has a high polarity, and therefore in a case in which an organic polymer material to be mixed has a low polarity, there was a tendency that affinity between the silane compound and the organic polymer material is low, causing poor dispersion and poor mixing to occur. For such a reason, in a case in which a silane coupling agent composition comprising such a silane compound was contained in a rubber composition, there was a tendency that viscosity deteriorates when uncrosslinked (unvulcanized). Meanwhile, in a case in which a conventional silane compound having a low-polar reactive functional group was added in order to increase affinity with a low-polarity organic polymer material, its reactivity with an organic polymer material was low, and its performance as a silane coupling agent was insufficient.

In addition, the silane compound described in Patent Literature 3 does not have appropriate reactivity with organic polymer materials.

Therefore, it is an object of the present invention to provide a silane coupling agent composition with which it is possible to obtain a rubber composition having excellent scorch resistance and viscosity properties of the compound (uncrosslinked compound viscosity) while having appropriate reactivity with an organic polymer material such as rubber. It is another object of the present invention to provide a rubber composition having excellent scorch resistance and uncrosslinked compound viscosity, and also, a crosslinked product of a rubber composition having excellent viscoelastic properties, and a tire using the same which has an excellent balance of wet grip performance and low-fuel consumption.

Solution to Problem

As a result of intensive studies, the present inventors found that by using, as silane coupling agents, two alicyclic silane compounds having affinity and moderate reactivity with organic polymer materials, having an alicyclic hydrocarbon moiety with an olefinic structure, and having a silyl group, a coupling reaction is promoted, and as a result, in a case in which a material to be compounded is a rubber composition, the dispersibility of an inorganic material such as silica is improved, and thus, a rubber composition having excellent scorch resistance and uncrosslinked compound viscosity, and also, a crosslinked product of a rubber composition having excellent viscoelastic properties, and a tire using the same which has an excellent balance of wet grip performance and low-fuel consumption can be obtained. The present invention is based on these findings.

The present invention encompasses the following inventions.

[1] A silane coupling agent composition comprising a silane compound, wherein the silane compound comprises a first silane compound represented by the following Formula (1):

(1)

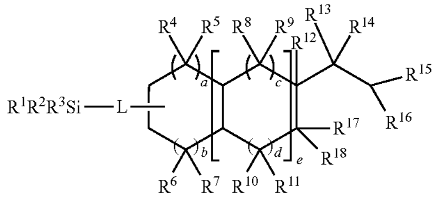

wherein $R^1$, $R^2$, and $R^3$ each independently represent a hydrocarbon group optionally containing an oxygen atom or a nitrogen atom, or a hydrogen atom, L is a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5; and $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms, and a second silane compound represented by the following Formula (11):

(11)

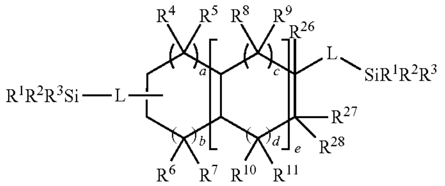

wherein $R^1$, $R^2$, and $R^3$ each independently represent a hydrocarbon group optionally containing an oxygen atom or a nitrogen atom, or a hydrogen atom;

L is independently a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5; and $R^{26}$, $R^{27}$, and $R^{28}$ each independently represent a hydrogen atom, a methyl group, or an alkyl group having 2 to 10 carbon atoms.

[2] The silane coupling agent composition according to [1], wherein the first silane compound is a compound represented by the following Formula (2):

(2)

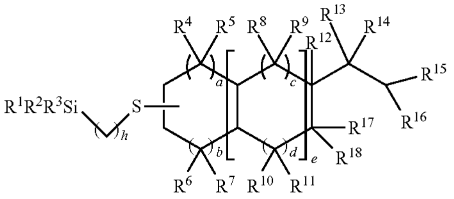

wherein $R^1$, $R^2$, and $R^3$ each independently represent a hydrocarbon group optionally containing an oxygen atom or a nitrogen atom, or a hydrogen atom;

h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5; and $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

[3] The silane coupling agent composition according to [1] or [2], wherein the second silane compound is a compound represented by the following Formula (12):

(12)

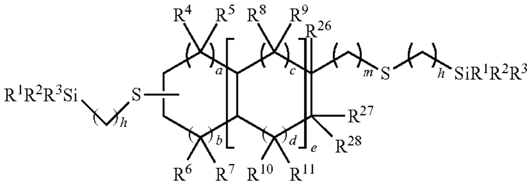

wherein $R^1$, $R^2$, and $R^3$ each independently represent a hydrocarbon group optionally containing an oxygen atom or a nitrogen atom, or a hydrogen atom, h is an integer of 1 to 10;

m is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{26}$, $R^{27}$, and $R^{28}$ each independently represent a hydrogen atom, a methyl group, or an alkyl group having 2 to 10 carbon atoms.

[4] The silane coupling agent composition according to any one of [1] to [3], wherein a content of the second silane compound is from 1% to 50% by mass with respect to a total content of the first silane compound and the second silane compound.

[5] The silane coupling agent composition according to any one of [1] to [4], wherein the silane compound further comprises a different silane compound other than first silane compound and the second silane compound.

[6] The silane coupling agent composition according to [5], wherein the different silane compound is a silane compound represented by the Formula (13):

(13)

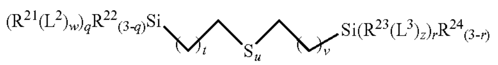

wherein t and v are each independently an integer of 0 to 10;

u is an integer of 2 to 10;

q and r are each independently an integer of 1 to 3;

w and z are each independently an integer of 0 or 1, $L^2$ and $L^3$ are each independently a hydrocarbon group optionally containing at least one heteroatom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently hydrogen or an alkyl group.

[7] The silane coupling agent composition according to any one of [1] to [6], which is used for a diene-based rubber.

[8] A rubber composition comprising the silane coupling agent composition according to any one of [1] to [7], a diene-based rubber, and silica, wherein a total content of the first silane compound and the second silane compound is from 0.5 to 30 parts by mass with respect to 100 parts by mass of the silica.

[9] The rubber composition according to [8], wherein a content of the silica is from 0.5 to 300 parts by mass with respect to 100 parts by mass of the diene-based rubber.

[10] The rubber composition according to [8] or [9], which is used for a tire.

[11] A crosslinked product of the rubber composition according to any one of [8] to [10].

[12] A pneumatic tire in which the crosslinked product according to [11] is used for a tire tread.

Advantageous Effects of Invention

Therefore, according to the present invention, a silane coupling agent composition, with which it is possible to obtain a rubber composition having excellent scorch resistance and uncrosslinked compound viscosity while having appropriate reactivity with an organic polymer material such as rubber, can be provided. Further, according to the present invention, a rubber composition having excellent scorch resistance and uncrosslinked compound viscosity, and also, a crosslinked product of a rubber composition having excellent viscoelastic properties, and a tire using the same which has an excellent balance of wet grip performance and low-fuel consumption are provided.

DETAILED DESCRIPTION OF THE INVENTION

Definition

Figure 1:
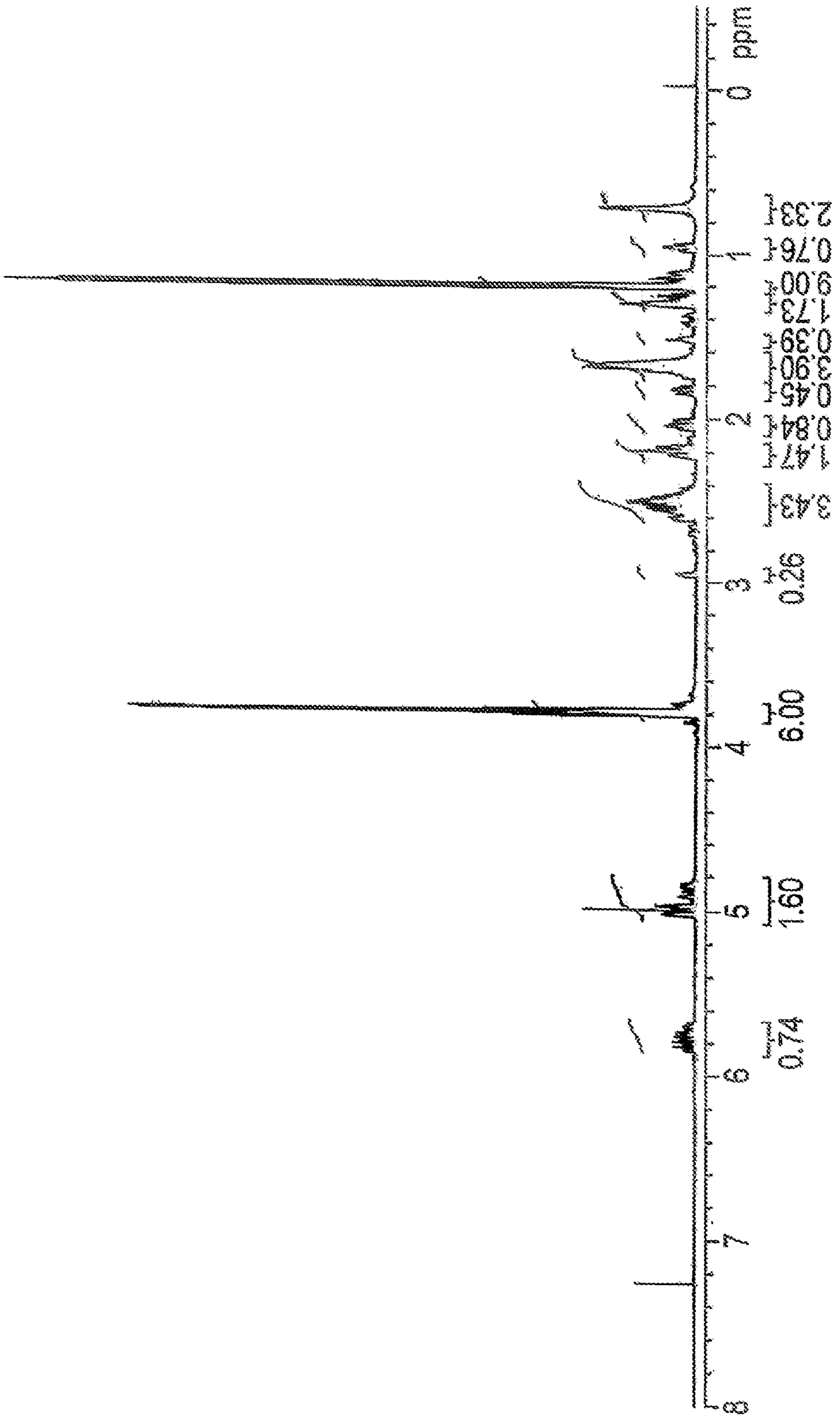
FIG. 1 is a $^1$H-NMR chart of silane compound 1 synthesized in Preparation Example 1.

The terms "part(s)", "%", and the like indicating compounding amounts used herein are based on mass unless otherwise specified.

[Silane Coupling Agent Composition]

The silane coupling agent composition of the present invention is characterized in that it comprises a silane compound, and the silane compound comprises a first silane compound and a second silane compound. With the silane coupling agent composition of the present invention, it is possible to obtain a rubber composition having excellent scorch resistance and uncrosslinked compound viscosity while having appropriate reactivity with an organic polymer material such as rubber.

The total content of a first silane compound and a second silane compound in the silane coupling agent composition may be preferably from 20% to 100% by mass, more preferably from 50% to 100% by mass, and still more preferably from 60% to 99% by mass with respect to the total mass of the silane coupling agent composition.

The content of a second silane compound in the silane coupling agent composition is preferably from 1% to 50% by mass, more preferably from 2% to 40% by mass, and still more preferably from 5% to 30% by mass with respect to the total content of a first silane compound and a second silane compound. As long as the proportion of the content of a second silane compound in the silane coupling agent composition is within the above-described numerical range, a rubber composition having excellent scorch resistance and uncrosslinked compound viscosity while having appropriate reactivity with an organic polymer material such as rubber, and also a crosslinked product of a rubber composition having excellent viscoelastic properties, and a tire using the same which has an excellent balance of wet grip performance and low-fuel consumption can be provided. A rubber composition having excellent scorch resistance and compound viscosity can easily be obtained.

The silane coupling agent composition may further comprise carbon black. As the carbon black, carbon black described in inorganic materials described below can be used. Each component of the silane coupling agent composition will be described in detail below.

(First Silane Compound)

The first silane compound contained in the silane coupling agent composition of the present invention is a compound represented by the following Formula (1):

(1)

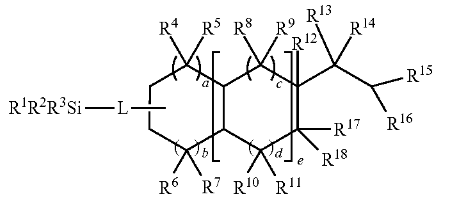

wherein

- $R^1$, $R^2$, and $R^3$ each independently represent a hydrocarbon group optionally containing an oxygen atom or a nitrogen atom, or a hydrogen atom,
- L is a hydrocarbon group optionally containing at least one heteroatom selected from the group consisting of nitrogen, oxygen, and sulfur;
- a is an integer of 0 or 1;
- b is an integer of 0 or 1;
- c is independently an integer of 0 or 1;
- d is independently an integer of 0 or 1;
- e is an integer of 0 to 5;
- $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
- f is an integer of 1 to 5;
- $R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
- g is an integer of 1 to 5; and
- $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or

- $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

In Formula (1) above, a is an integer of 0 or 1, preferably 1;

- b is an integer of 0 or 1, preferably 1;
- c is independently an integer of 0 or 1, preferably 1;
- d is independently an integer of 0 or 1, preferably 1;
- e is an integer of 0 to 5, preferably an integer of 0 to 3, more preferably an integer of 0 to 2, and still more preferably an integer of 0 or 1;
- $R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;
- f is an integer of 1 to 5, preferably an integer of 1 to 4, more preferably an integer of 1 to 3, and still more preferably 1;
- $R^8$, $R^9$, $R^{10}$ and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;
- g is an integer of 1 to 5, preferably an integer of 1 to 4, more preferably an integer of 1 to 3, and still more preferably 1;
- $R^{16}$ is a hydrogen atom, a methyl group, or an alkyl group having 2 to 8 carbon atoms, preferably a hydrogen atom, a methyl group, or an alkyl group having 2 or 3 carbon atoms, more preferably a hydrogen atom or a methyl group, and still more preferably a hydrogen atom, while $R^{17}$ is a hydrogen atom, a methyl group, or an alkyl group having 2 to 10 carbon atoms, preferably a hydrogen atom, a methyl group, or an alkyl group having 2 to 5 carbon atoms, more preferably a hydrogen atom or a methyl group, and still more preferably a hydrogen atom, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, preferably a 4- to 7-membered alicyclic hydrocarbon, more preferably a 5- or 6-membered alicyclic hydrocarbon, and still more preferably a 5-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

In Formula (1) above, $R^1$, $R^2$, and $R^3$ each independently represent a hydrocarbon group optionally containing an oxygen atom or a nitrogen atom, or a hydrogen atom. Examples of the hydrocarbon group include an alkyl group, an aralkyl group, and an aryl group.

Examples of the alkyl group include a methyl group, an ethyl group, a propyl group, a butyl group, an isopropyl group, a tert-butyl group, a 2-ethylhexyl group, a cyclopentyl group, and a cyclohexyl group. The number of carbon atoms in the alkyl group is preferably from 1 to 60, more preferably from 1 to 30, and in particular, the alkyl group is preferably a methyl group or an ethyl group.

Examples of the aralkyl group include a benzyl group, a phenethyl group, a naphthylmethyl group, and a biphenylmethyl group. The number of carbon atoms in the aralkyl group is preferably from 7 to 60, more preferably from 7 to 20, and still more preferably from 7 to 14.

Examples of the aryl group include a phenyl group, a biphenyl group, a naphthyl group, a tolyl group, and a xylyl group. The number of carbon atoms in the aryl group is preferably from 6 to 60, more preferably from 6 to 24, and still more preferably from 6 to 12.

A hydrocarbon group containing an oxygen atom or a nitrogen atom is a group having a structure in which a carbon atom in the hydrocarbon group is replaced with an oxygen atom or a nitrogen atom.

In a further preferred embodiment of the present invention, the hydrocarbon group which may contain an oxygen atom or a nitrogen atom for $R^1$, $R^2$, and $R^3$ above is an alkoxy group, an amino group substituted with one or more alkyl groups, or an alkyl group. It is more preferably an alkoxy group having 1 to 30 carbon atoms, more preferably an alkoxy group having 1 to 20 carbon atoms, more preferably an amino group substituted with one or more alkyl groups having 1 to 30 carbon atoms, and still more preferably amino group substituted with one or more alkyl groups having 1 to 20 carbon atoms, or it is more preferably an alkyl group having 1 to 30 carbon atoms and still more preferably an alkyl group having 1 to 20 carbon atoms. Examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. Examples of the alkyl group include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

In Formula (1) above, L is a hydrocarbon group optionally containing at least one heteroatom selected from the group consisting of nitrogen, oxygen, and sulfur. L is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur. Of these, L is a hydrocarbon group containing sulfur. The total length of the linear moiety connecting the silyl group and the alicyclic hydrocarbon moiety in such a hydrocarbon group is preferably from 3 to 8, more preferably from 4 to 7, and still more preferably from 4 to 6 as the total number of atoms of carbon, nitrogen, oxygen, or sulfur.

The first silane compound in the silane coupling agent composition of the present invention is preferably a sulfur-containing silane compound.

The first silane compound contained in the silane coupling agent composition of the present invention is preferably a compound represented by the following Formula (2):

(2)

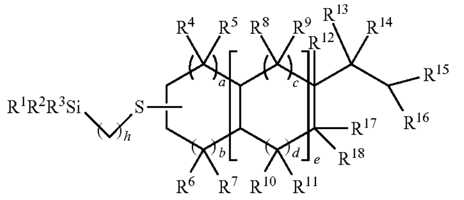

wherein $R^1$, $R^2$, and $R^3$ each independently represent a hydrocarbon group optionally containing an oxygen atom or a nitrogen atom, or a hydrogen atom;

h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5;

$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

For the compound represented by Formula (2) above, h is an integer of 1 to 10, preferably 1 to 8, more preferably 2 to 7, still more preferably 3 to 6, yet more preferably 3 to 5, and particularly preferably 3. In addition, a to g and $R^1$ to $R^{18}$ are as explained in Formula (1) above.

The first silane compound contained in the silane coupling agent composition of the present invention is more preferably a compound represented by the following Formula (3):

(3)

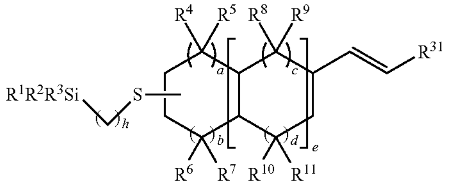

wherein $R^1$, $R^2$, and $R^3$ each independently represent a hydrocarbon group optionally containing an oxygen atom or a nitrogen atom, or a hydrogen atom;

h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5;

$R^{31}$ is a hydrogen atom, a methyl group, or an alkyl group having 2 to 8 carbon atoms.

For the compound represented by Formula (3) above, a to g and $R^1$ to $R^{11}$ are as explained in Formula (1) above, and h is explained in Formula (2) above.

$R^{31}$ in Formula (3) is a hydrogen atom, a methyl group, or an alkyl group having 2 to 8 carbon atoms, preferably a hydrogen atom, a methyl group, or an alkyl group having 2 to 5 carbon atoms, more preferably a hydrogen atom, a methyl group, or an alkyl group having 1 or 2 carbon atoms, and still more preferably a hydrogen atom.

The first silane compound contained in the silane coupling agent composition of the present invention is more preferably a compound represented by the following Formula (4):

(4)

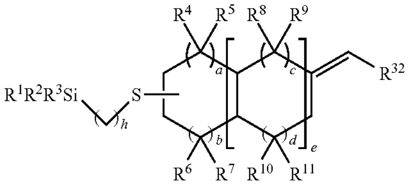

wherein $R^1$, $R^2$, and $R^3$ each independently represent a hydrocarbon group optionally containing an oxygen atom or a nitrogen atom, or a hydrogen atom, h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5;

$R^{32}$ is a hydrogen atom, a methyl group, or an alkyl group having 2 to 9 carbon atoms.

For the compound represented by Formula (4) above, a to g and $R^1$ to $R^{11}$ are as explained in Formula (1) above, and h is explained in Formula (2) above.

$R^{32}$ in Formula (4) is a hydrogen atom, a methyl group, or an alkyl group having 2 to 9 carbon atoms, preferably a methyl group or an alkyl group having 2 to 5 carbon atoms, more preferably a methyl group or an alkyl group having 1 or 2 carbon atoms, and still more preferably a methyl group.

The first silane compound contained in the silane coupling agent composition of the present invention is more preferably a compound represented by the following Formula (5):

(5)

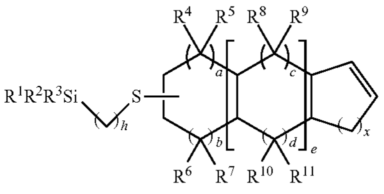

wherein $R^1$, $R^2$, and $R^3$ each independently represent a hydrocarbon group optionally containing an oxygen atom or a nitrogen atom, or a hydrogen atom, h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5;

x is an integer of 0 to 5.

For the compound represented by Formula (5) above, a to g and $R^1$ to $R^{11}$ are as explained in Formula (1) above, and h is explained in Formula (2) above.

In Formula (5), x is an integer of 0 to 5, preferably an integer of 0 to 3, more preferably 1 or 2, and still more preferably 1.

The first silane compound contained in the silane coupling agent composition of the present invention is still more preferably a compound represented by the following Formula (6):

(6)

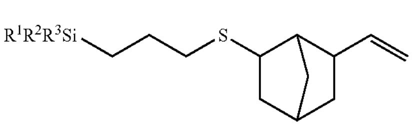

wherein $R^1$, $R^2$, and $R^3$ each independently represent a hydrocarbon group optionally containing an oxygen atom or a nitrogen atom, or a hydrogen atom; or Formula (7)

(7)

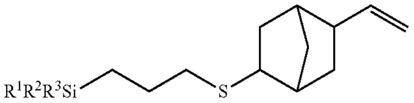

wherein $R^1$, $R^2$, and $R^3$ each independently represent a hydrocarbon group optionally containing an oxygen atom or a nitrogen atom, or a hydrogen atom; or Formula (8)

(8)

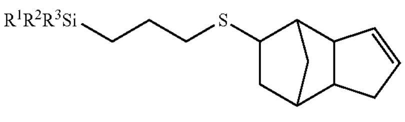

wherein $R^1$, $R^2$, and $R^3$ each independently represent a hydrocarbon group optionally containing an oxygen atom or a nitrogen atom, or a hydrogen atom; or Formula (9)

(9)

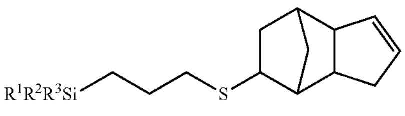

wherein $R^1$, $R^2$, and $R^3$ each independently represent a hydrocarbon group optionally containing an oxygen atom or a nitrogen atom, or a hydrogen atom.

For the compounds represented by Formulas (6) to (9) above, $R^1$ to $R^3$ are as explained in Formula (1) above.

Another further preferred embodiment of the first silane compound in the silane coupling agent composition of the present invention can be compound represented by the following formulas. For the compounds represented by the following formulas, $R^1$ to $R^3$ are as explained in Formula (1) above.

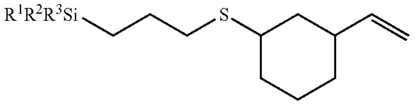

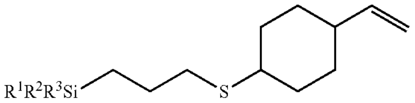

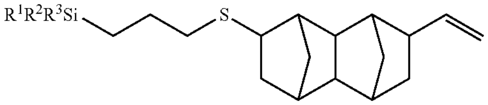

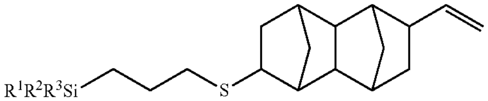

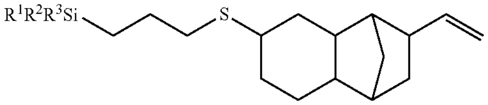

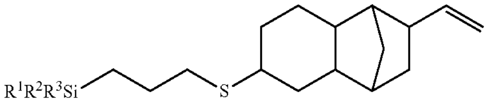

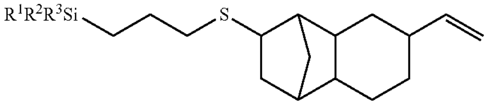

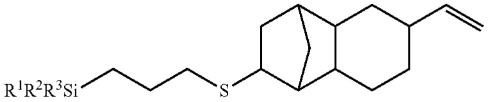

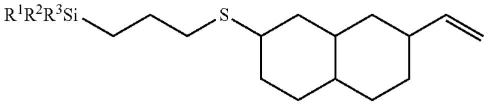

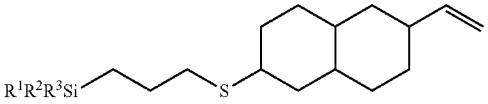

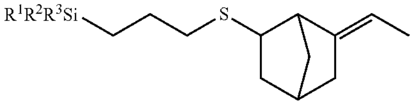

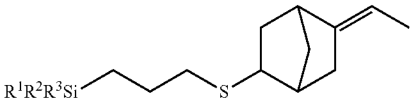

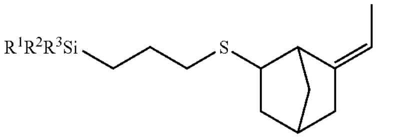

-continued

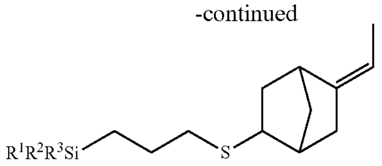

wherein $R^1$, $R^2$, and $R^3$ each independently represent a hydrocarbon group optionally containing an oxygen atom or a nitrogen atom, or a hydrogen atom.

A still more preferred embodiment of the first silane compound contained in the silane coupling agent composition of the present invention can be a silane compound in which the R1R2R3Si group in Formulas (1) to (9) above has a chemical structure of the following Formula (10):

$$(R^{19}(L^{1})_{j})_{k}R^{20}_{(3-k)}Si-*$$ (10)

wherein

- $R^{19}$ is each independently an alkoxy group or an amino group substituted with one or more alkyl groups;
- $R^{20}$ is each independently hydrogen or an alkyl group,
- $L^1$ is each independently a hydrocarbon group optionally containing at least one heteroatom selected from the group consisting of nitrogen, oxygen, and sulfur;
- j is independently an integer of 0 or 1;
- k is an integer of 1 to 3; and
- an asterisk (*) indicates a site bound to a moiety other than the silyl group of the silane compound.

In Formula (10) above, $R^{19}$ is each independently an alkoxy group or an amino group substituted with one or more alkyl groups. In one preferred embodiment, $R^{19}$ is each independently a hydrolyzable group, which is an alkoxy group, more preferably an alkoxy group having 1 to 30 carbon atoms, and still more preferably an alkoxy group having 1 to 20 carbon atoms, or an amino group substituted with one or more alkyl groups, more preferably an amino group substituted with one or more alkyl groups having 1 to 30 carbon atoms, and still more preferably amino group substituted with one or more alkyl groups having 1 to 20 carbon atoms. Specific examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. An alkoxy group and an amino group may be bound to silicon (Si) via a linking group consisting of a hydrocarbon group optionally containing at least one heteroatom selected from the group consisting of nitrogen, oxygen, and sulfur.

$R^{20}$ is each independently a hydrogen atom or an alkyl group, more preferably an alkyl group having 1 to 30 carbon atoms, and still more preferably an alkyl group having 1 to 20 carbon atoms. Specific examples thereof include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

In Formula (10) above, $L^1$ is each independently a hydrocarbon group optionally containing at least one heteroatom selected from the group consisting of nitrogen, oxygen, and sulfur. L is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur.

In Formula (10) above, k is an integer of 1-3, preferably an integer of 2-3 and more preferably 3.

In addition, j is independently an integer of 0 or 1, preferably 0.

The first silane compound contained in the silane coupling agent composition of the present invention is further preferably a silane compound in which the $R^1R^2R^3Si$ group is a triethoxysilyl group or a trimethoxysilyl group in Formulas (1) to (9) above, and still further preferably a silane compound in which the $R^1R^2R^3Si$ group is a triethoxysilyl group in Formulas (1) to (9) above A particularly preferred embodiment of the first silane compound contained in the silane coupling agent composition of the present invention can be compounds represented by the following formulas:

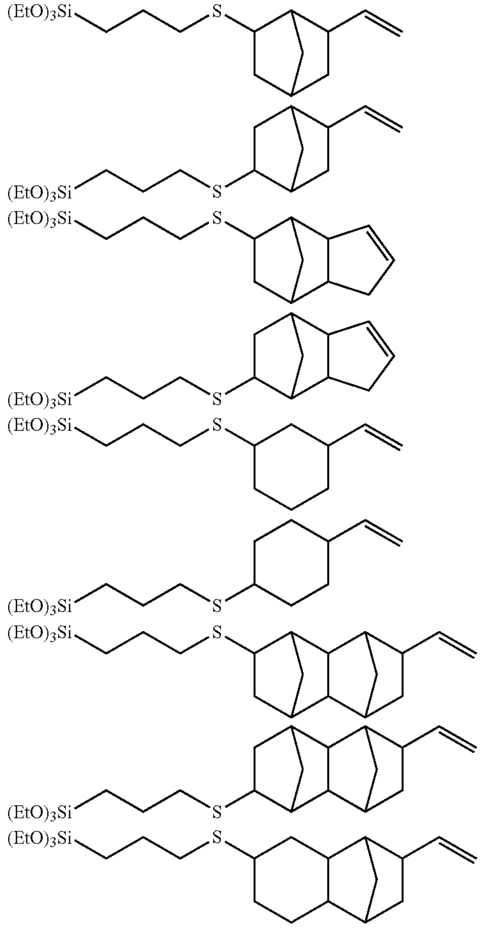

-continued

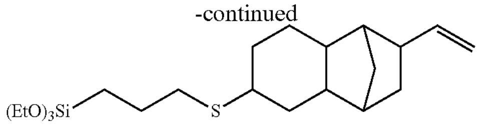

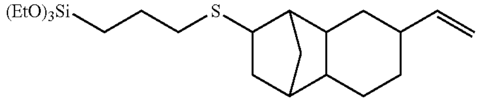

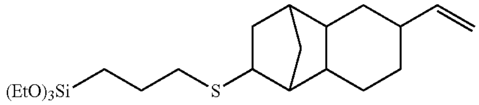

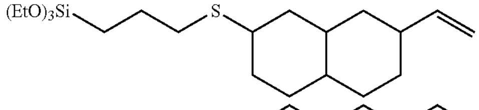

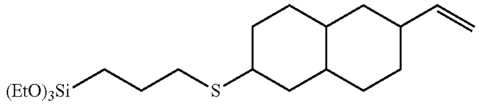

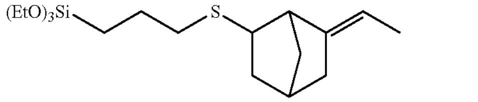

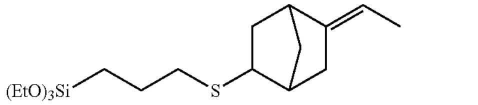

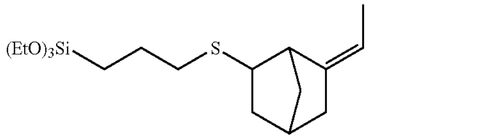

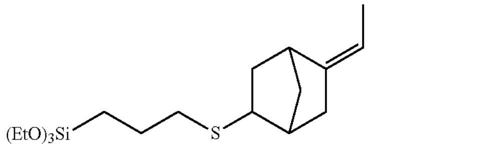

The first silane compound of the present invention is preferably its stereoisomer or any mixture of those stereoisomers.

(Method for Producing First Silane Compound)

One embodiment of the method for producing the first silane compound represented by Formula (1) contained in the silane coupling agent composition of the present invention will be explained but is not limited to the following production method. For example, the first silane compound can be produced by reacting a compound represented by Formula (14):

(14)

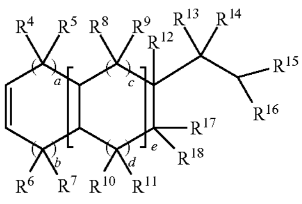

wherein a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5;

$R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms; and a compound represented by Formula (15):

$$R^1R^2R^3Si-Y \quad (15)$$

wherein $R^1$, $R^2$, and $R^3$ each independently represent a hydrocarbon group optionally containing an oxygen atom or a nitrogen atom, or a hydrogen atom, Y is a hydrocarbon group optionally containing at least one heteroatom selected from the group consisting of nitrogen, oxygen, and sulfur.

In Formulas (14) and (15) above, $R^1$ to $R^{18}$ and a to g are as explained for the first silane compound represented by Formula (1).

In Formula (15) above, Y is a hydrocarbon group optionally containing at least one heteroatom selected from the group consisting of nitrogen, oxygen, and sulfur. Y is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur. Of these, Y is a hydrocarbon group containing sulfur. The total length of the linear moiety connecting the silyl group and the site bound to the alicyclic hydrocarbon moiety in such a hydrocarbon group is preferably from 3 to 8, more preferably from 4 to 7, and still more preferably from 4 to 6 as the total number of atoms of carbon, nitrogen, oxygen, or sulfur.

In producing the first silane compound represented by Formula (1), the silane compound can be synthesized by subjecting the compound represented by Formula (14) and the compound represented by Formula (15) to an addition reaction or condensation reaction. As the addition reaction used herein, a radical addition reaction, a conjugate addition reaction, a nucleophilic addition reaction, an electrophilic addition reaction, and the like can be used. For example, a pericyclic reaction, a hydrosilylation reaction, a hydroamination reaction, and the like can be used. As the condensation reaction, for example, an esterification reaction, an amidation reaction, a thioesterification reaction, a thioamidation reaction, a Friedel-Crafts reaction, and the like can be used.

The compound represented by Formula (14) above can be synthesized by a Diels-Alder reaction between identical or different conjugated dienes or a Diels-Alder reaction of conjugated dienes and alkenes based on the knowledge already known to those skilled in the art. The compound represented by Formula (14) can be prepared by thermally denaturing and/or purifying the compound synthesized by the Diels-Alder reaction as necessary.

The first silane compound represented by Formula (2) contained in the silane coupling agent composition of the present invention can be produced by reacting a compound represented by Formula (14) above and a compound represented by the following Formula (16):

(16)

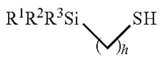

wherein $R^1$, $R^2$, and $R^3$ each independently represent a hydrocarbon group optionally containing an oxygen atom or a nitrogen atom, or a hydrogen atom, h is an integer of 1 to 10.

In Formulas (14) and (16) above, $R^1$ to $R^{18}$ and a to g are as explained for the first silane compound represented by Formula (1). Further, h is explained for the compound represented by Formula (2).

Here, it is considered that the compound represented by Formula (2) above is synthesized by mixing and heating the compound represented by Formula (14) above and the compound represented by Formula (16) above such that the mercapto group in the compound represented by Formula (16) reacts with the carbon-carbon unsaturated bond moiety in the compound represented by Formula (14). The compound represented by Formula (16) above is mixed preferably in an amount of from 0.1 to 4 mol and more preferably in an amount of from 0.2 to 3 mol with respect to 1 mol of the compound represented by Formula (14) above. The heating temperature is preferably from 40° C. to 300° C. and more preferably from 50° C. to 200° C.

Examples of the compound represented by Formula (16) above include an alkoxysilane compound having a mercapto group. Examples of the alkoxysilane compound having a mercapto group include mercaptotrimethoxysilane, mercaptotriethoxysilane, mercaptomethyl trimethoxysilane, mercaptomethyl triethoxysilane, mercaptomethyl tripropoxysilane, 2-mercaptoethyl trimethoxysilane, 2-mercaptoethyl triethoxysilane, 3-mercaptopropyl trimethoxysilane, 4-mercaptobutyl trimethoxysilane, 3-mercaptopropyl triethoxysilane, 4-mercaptobutyl triethoxysilane, 2-mercaptoethyl tripropoxysilane, 3-mercaptopropyl tripropoxysilane, 4-mercaptobutyl tripropoxysilane, 2-mercaptoethyl methyldimethoxysilane, 3-mercaptopropyl methyldimethoxysilane, 4-mercaptobutyl methyldimethoxysilane, 2-mercaptoethyl methyldiethoxysilane, 3-mercaptopropyl methyldiethoxysilane, and 4-mercaptobutyl methyldiethoxysilane.

In addition, the compound represented by Formula (2) above can also be synthesized by mixing and heating the compound represented by Formula (14) above and the compound represented by Formula (13) described later. It is considered that the polysulfide bond in the compound represented by Formula (13) is cleaved, and this reacts with the carbon-carbon unsaturated bond moiety in the compound represented by Formula (14) such that the compound represented by Formula (2) is synthesized. The compound represented by Formula (13) is mixed preferably in an amount of from 0.1 to 4 mol and more preferably in an amount of from 0.3 to 3 mol with respect to 1 mol of the compound represented by Formula (14). The heating temperature is preferably from 40° C. to 300° C. and more preferably from 50° C. to 200° C.

A radical initiator can also be used together as necessary. Examples of the radical initiator that can be used include: azo compounds such as azobisisobutyronitrile (AIBN) and 1,1'-azobis(cyclohexanecarbonitrile) (ABCN); peroxides such as di-tert-butyl peroxide (t-BuOOBu-t) or tert-butyl hydroperoxide (t-BuOOH), benzoyl peroxide (BPO, PhC(=O)OOC(=O)pH), methyl ethyl ketone peroxide, and dicumyl peroxide (DCP); dihalogen compounds such as chlorine molecules; redox initiators which are combinations of oxidizing and reducing agents such as a combination of hydrogen peroxide and an iron (II) salt, a combination of persulfate and sodium bisulfite, and the like serving as reagents that can generate radicals at low temperatures; triethyl borane ($Et_3B$); and diethyl zinc ($Et_2Zn$).

Among the compounds represented by Formula (13) described later, bis[3-(triethoxysilyl)propyl]tetrasulfide may be a commercially available product, which is, for example, Si-69 manufactured by Evonik Industries AG. In addition, bis[3-(triethoxysilyl)propyl]disulfide may also be a commercially available product, which is, for example, Si-75 manufactured by Evonik Industries AG.

(Second Silane Compound)

The second silane compound contained in the silane coupling agent composition of the present invention is a compound represented by the following Formula (11):

(11)

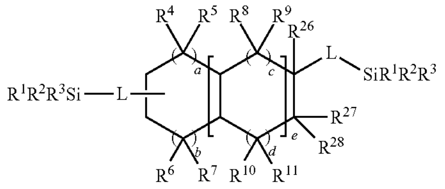

wherein $R^1$, $R^2$, and $R^3$ each independently represent a hydrocarbon group optionally containing an oxygen atom or a nitrogen atom, or a hydrogen atom;

L is independently a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5;

$R^{26}$, $R^{27}$, and $R^{28}$ each independently represent a hydrogen atom, a methyl group, or an alkyl group having 2 to 10 carbon atoms.

In Formula (11) above, a preferred embodiment of each of $R^1$, $R^2$, $R^3$, $R^4$, $R^5$, $R^6$, $R^7$, $R^8$, $R^9$, $R^{10}$, and $R^{11}$ is explained in Formula (1) above.

A preferred embodiment of each L is explained in Formula (1) above.

A preferred embodiment of a, b, c, d, and e is explained in Formula (1) above.

$R^{26}$, $R^{27}$, and $R^{28}$ each independently represent a hydrogen atom, a methyl group, or an alkyl group having 2 to 10 carbon atoms, preferably a hydrogen atom.

The second silane compound in the silane coupling agent composition of the present invention is preferably a sulfur-containing silane compound.

The first silane compound represented by Formula (11) contained in the silane coupling agent composition of the present invention is preferably a compound represented by the following Formula (12):

(12)

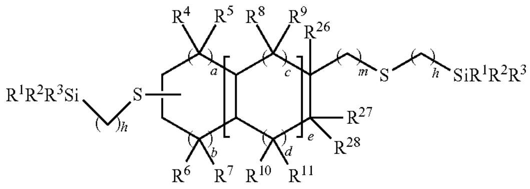

wherein $R^1$, $R^2$, and $R^3$ each independently represent a hydrocarbon group optionally containing an oxygen atom or a nitrogen atom, or a hydrogen atom, h is an integer of 1 to 10;

m is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $—(CH_2)_f—$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $—(CH_2)_g—$;

g is an integer of 1 to 5; and $R^{26}$, $R^{27}$, and $R^{28}$ each independently represent a hydrogen atom, a methyl group, or an alkyl group having 2 to 10 carbon atoms.

In Formula (12) above, a preferred embodiment of each of $R^1$, $R^2$, $R^3$, $R^4$, $R^5$, $R^6$, $R^7$, $R^8$, $R^9$, $R^{10}$, $R^{11}$, $R^{26}$, $R^{27}$, $R^{28}$ is explained in Formula (11) above.

A preferred embodiment of each L is explained in Formula (11) above.

A preferred embodiment of a, b, c, d, and e is explained in Formula (11) above.

A preferred embodiment of h is explained in Formula (2) above.

In Formula (12), m is an integer of 1 to 10, preferably 1 to 8, more preferably 1 to 6, still more preferably 1 to 4, and yet more preferably 1 to 3.

The second silane compound contained in the silane coupling agent composition of the present invention is still more preferably a compound represented by the following Formula (17):

(17)

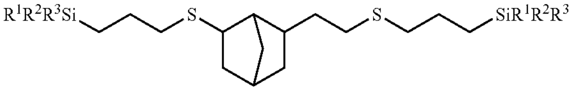

wherein $R^1$, $R^2$, and $R^3$ each independently represent a hydrocarbon group optionally containing an oxygen atom or a nitrogen atom, or a hydrogen atom, or Formula (18)

(18)

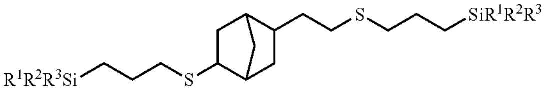

wherein $R^1$, $R^2$, and $R^3$ each independently represent a hydrocarbon group optionally containing an oxygen atom or a nitrogen atom, or a hydrogen atom.

For the compounds represented by Formulas (17) and (18), $R^1$, $R^2$, and $R^3$ are as explained in Formula (11) above.

Another further preferred embodiment of the first silane compound in the silane coupling agent composition of the present invention can be compound represented by the following formulas. For the compounds represented by the following formulas, $R^1$ to $R^3$ are as explained in Formula (1) above.

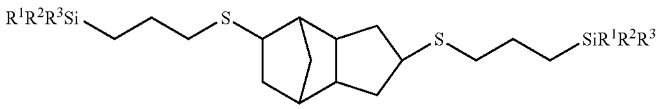

-continued
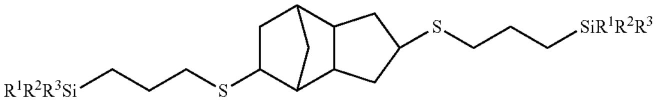
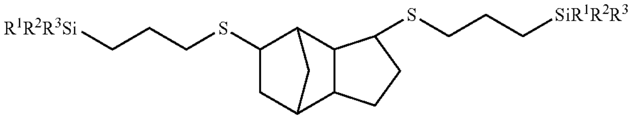
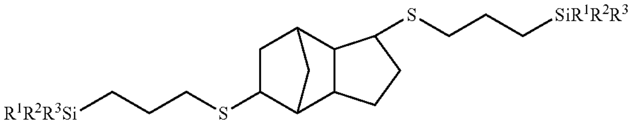
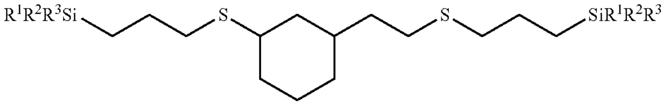
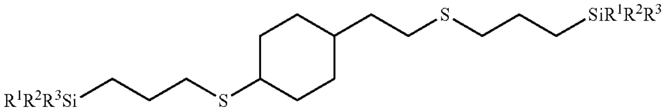
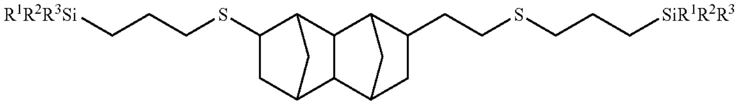
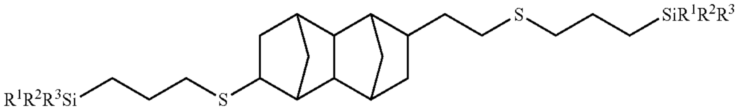
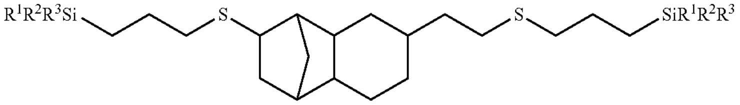
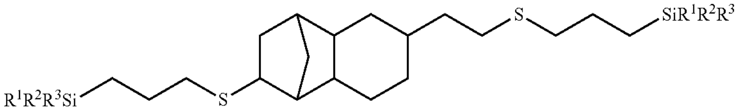
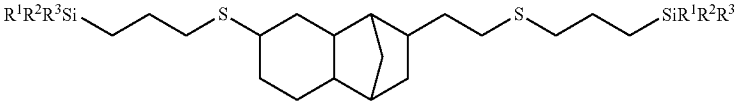
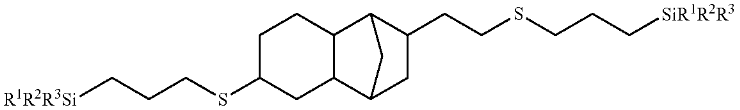
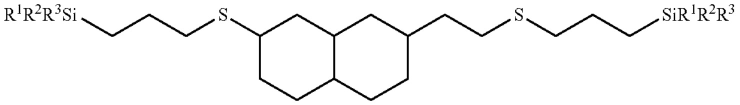
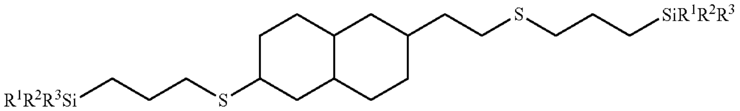
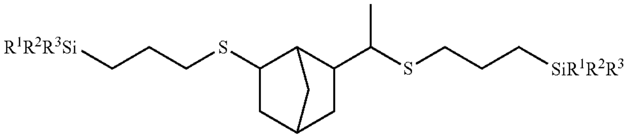
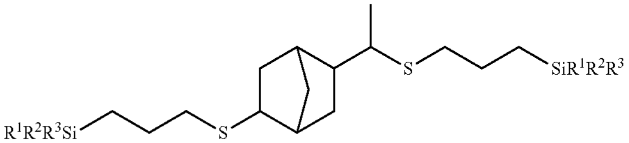

Examples of a still more preferred embodiment of the second silane compound represented by Formula (11) above contained in the silane coupling agent composition of the present invention include a silane compound in which the $R^1R^2R^3Si$ group has the chemical structure of Formula (10). In particular, the second silane compound is further preferably a silane compound in which the $R^1R^2R^3Si$ group is a triethoxysilyl group or a trimethoxysilyl group, and still further preferably a silane compound in which the $R^1R^2R^3Si$ group is a triethoxysilyl group.

A particularly preferred embodiment of the second silane compound contained in the silane coupling agent composition of the present invention can be compounds represented by the following formulas.

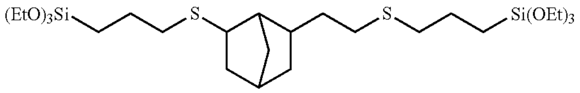

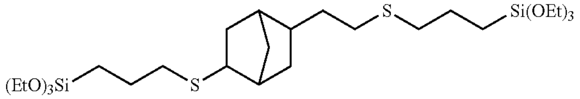

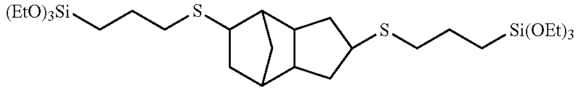

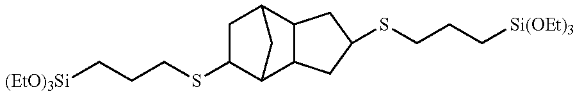

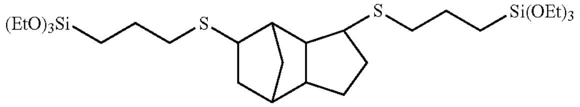

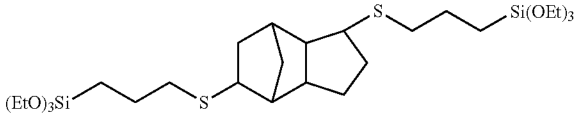

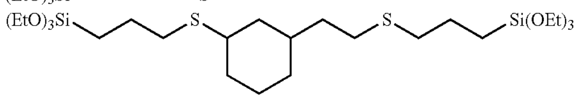

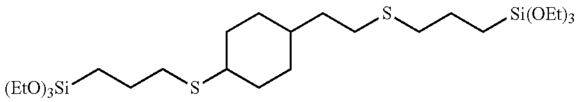

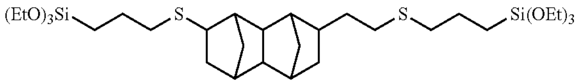

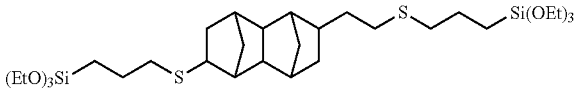

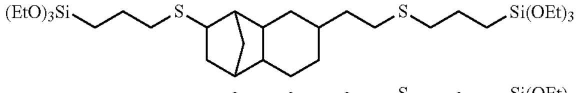

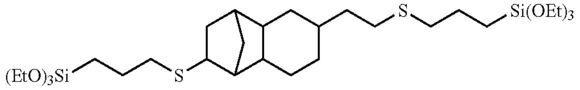

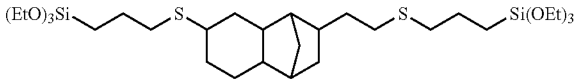

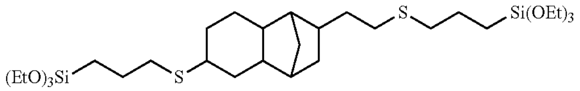

-continued

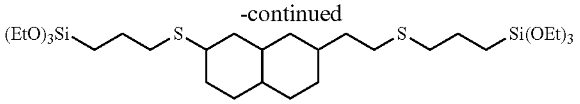

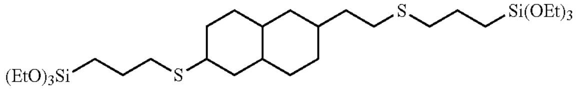

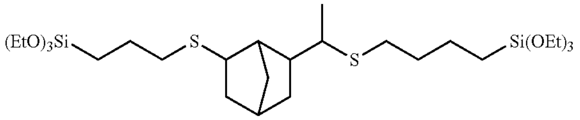

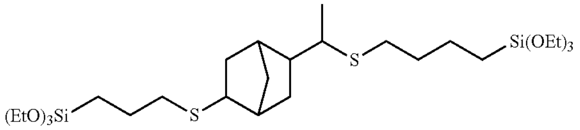

The second silane compound of the present invention is preferably its stereoisomer or any mixture of those stereoisomers.

(Method for Producing Second Silane Compound)

One embodiment of the method for producing the second silane compound represented by Formula (11) contained in the silane coupling agent composition of the present invention will be explained but is not limited to the following production method. For example, the second silane compound can be produced by reacting a compound represented by the following Formula (14):

(14)

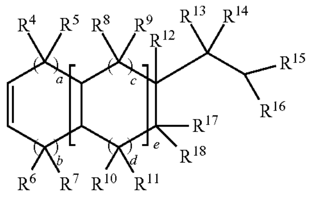

wherein a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{12}$, $R^{13}$, $R^{14}$, $R^{15}$, $R^{16}$, $R^{17}$, and $R^{18}$ each independently represent a hydrogen atom, a methyl group, or an alkyl group having 2 to 10 carbon atoms, provided that $R^{12}$ and $R^{13}$ combine with each other to form a double bond, or $R^{14}$ and $R^{15}$ combine with each other to form a double bond, and $R^{16}$ and $R^{17}$ optionally combine with each other to form a 4- to 9-membered alicyclic hydrocarbon; and a compound represented by Formula (15) above. Preferred embodiments of Formulas (14) and (15) above are as explained for the first silane compound.

In producing the second silane compound, the silane compound can be synthesized by subjecting the compound represented by Formula (14) above and the compound represented by Formula (15) above to an addition reaction or condensation reaction. As the addition reaction used herein, a radical addition reaction, a conjugate addition reaction, a nucleophilic addition reaction, an electrophilic addition reaction, and the like can be used. For example, a pericyclic reaction, a hydrosilylation reaction, a hydroamination reaction, and the like can be used. As the condensation reaction, for example, an esterification reaction, an amidation reaction, a thioesterification reaction, a thioamidation reaction, a Friedel-Crafts reaction, and the like can be used.

The compound represented by Formula (14) above can be synthesized by a Diels-Alder reaction between identical or different conjugated dienes or a Diels-Alder reaction of conjugated dienes and alkenes based on the knowledge already known to those skilled in the art. The compound represented by Formula (14) above can be prepared by thermally denaturing and/or purifying the compound synthesized by the Diels-Alder reaction as necessary.

The second silane compound can be produced by reacting the compound represented by Formula (14) above with the compound represented by Formula (16) above. A preferred embodiment of Formula (16) above is explained for the first silane compound.

Here, it is considered that the second silane compound is synthesized by mixing and heating the compound represented by Formula (14) above and the compound represented by Formula (16) above such that the mercapto group in the compound represented by Formula (16) reacts with the two carbon-carbon unsaturated bond moieties in the compound represented by Formula (14). The compound represented by Formula (16) above is mixed preferably in an amount of from 0.1 to 4 mol and more preferably in an amount of from 0.3 to 3 mol with respect to 1 mol of the compound represented by Formula (14) above. The heating temperature is preferably from 40° C. to 300° C. and more preferably from 50° C. to 200° C.

In addition, the second silane compound can also be synthesized by mixing and heating the compound represented by Formula (14) above and the compound represented by Formula (13) described later. It is considered that the polysulfide bond in the compound represented by Formula (13) is cleaved, and this reacts with the two carbon-carbon unsaturated bond moieties in the compound represented by Formula (14) such that the compound represented by Formula (2) is synthesized. The compound represented by Formula (13) is mixed preferably in an amount of from 0.1 to 4 mol and more preferably in an amount of from 0.3 to 3 mol with respect to 1 mol of the compound represented by Formula (14). The heating temperature is preferably from 40° C. to 300° C. and more preferably from 50° C. to 200° C.

A radical initiator can also be used together as necessary. Examples of the radical initiator that can be used include: azo compounds such as azobisisobutyronitrile (AIBN) and 1,1'-azobis(cyclohexanecarbonitrile) (ABCN); peroxides such as di-tert-butyl peroxide (t-BuOOBu-t) or tert-butyl hydroperoxide (t-BuOOH), benzoyl peroxide (BPO, PhC(═O)OOC(═O)pH), methyl ethyl ketone peroxide, and dicumyl peroxide (DCP); dihalogen compounds such as chlorine molecules; redox initiators which are combinations of oxidizing and reducing agents such as a combination of hydrogen peroxide and an iron (II) salt, a combination of persulfate and sodium bisulfite, and the like serving as reagents that can generate radicals at low temperatures; triethyl borane ($Et_3B$); and diethyl zinc ($Et_2Zn$).

Among the compounds represented by Formula (13) described later, bis[3-(triethoxysilyl)propyl]tetrasulfide may be a commercially available product, which is, for example, Si-69 manufactured by Evonik Industries AG. In addition, bis[3-(triethoxysilyl)propyl]disulfide may also be a commercially available product, which is, for example, Si-75 manufactured by Evonik Industries AG.

(Different Silane Compound)

The silane coupling agent composition of the present invention may further comprise a different silane compound other than the first silane compound and the second silane compound (also herein referred to as "different silane compound" in some cases). When a rubber composition comprising the silane coupling agent composition of the present invention is vulcanized by reaction, the different silane compound is also incorporated into the vulcanization reaction, and thus, the first silane compound and the second silane compound, which function as silane coupling agents, react with the different silane compound. It is considered that this reaction creates a synergistic effect that increases the coupling efficiency. The different silane compound in the rubber composition of the present invention is preferably a sulfur-containing silane compound other than the first silane compound and the second silane compound.

As the different silane compound, for example, a compound represented by the following Formula (13) can be used:

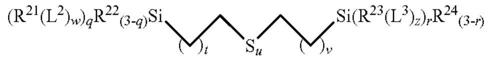

wherein

- t and v are each independently an integer of 0 to 10;
- u is an integer of 2 to 10;
- q and r are each independently an integer of 1 to 3;
- w and z are each independently an integer of 0 or 1,
- $L^2$ and $L^3$ are each independently a hydrocarbon group optionally containing at least one heteroatom selected from the group consisting of nitrogen, oxygen, and sulfur;
- $R^{21}$ and $R^{23}$ are each independently an alkoxy group or an amino group substituted with one or more alkyl groups; and
- $R^{22}$ and $R^{24}$ are each independently a hydrogen atom or an alkyl group.

In Formula (13) above, t and v are each independently an integer of 0 to 10, preferably an integer of 0 to 5, more preferably an integer of 1 to 3, and still more preferably 2;

- u is an integer of 2 to 10, preferably an integer of 2 to 8;
- q and r are each independently an integer of 1 to 3, preferably an integer of 2 to 3 and more preferably 3;
- w and z are each independently an integer of 0 or 1, preferably 0.
- $L^2$ and $L^3$ are each independently a hydrocarbon group optionally containing at least one heteroatom selected from the group consisting of nitrogen, oxygen, and sulfur; L is preferably a hydrocarbon group having 1 to 30 carbon atoms optionally containing at least one heteroatom selected from the group consisting of nitrogen, oxygen, and sulfur, more preferably a hydrocarbon group having 1 to 20 carbon atoms optionally containing at least one heteroatom selected from the group consisting of nitrogen, oxygen, and sulfur, and still more preferably a hydrocarbon group having 1 to 10 carbon atoms optionally containing at least one heteroatom selected from the group consisting of nitrogen, oxygen, and sulfur.

$R^{21}$ and $R^{23}$ are each independently a hydrolyzable group, which is an alkoxy group, more preferably an alkoxy group having 1 to 30 carbon atoms, and still more preferably an alkoxy group having 1 to 20 carbon atoms, or an amino group substituted with one or more alkyl groups, more preferably an amino group substituted with one or more alkyl groups having 1 to 30 carbon atoms, and still more preferably amino group substituted with one or more alkyl groups having 1 to 20 carbon atoms. Specific examples of the alkoxy group include a methoxy group, an ethoxy group, a propoxy group, an isopropoxy group, a butoxy group, and an isobutoxy group, among which a methoxy group and an ethoxy group are preferable. Examples of the amino group substituted with one or more alkyl groups include an N-methylamino group, an N,N-dimethylamino group, an N-ethylamino group, an N,N-diethylamino group, and an N-isopropylamino group, among which an N-methylamino group or an N-ethyl amino group is preferable. An alkoxy group and an amino group may be bound to silicon (Si) via a linking group consisting of a hydrocarbon group optionally containing at least one heteroatom selected from the group consisting of nitrogen, oxygen, and sulfur.

$R^{22}$ and $R^{24}$ is each independently a hydrogen atom or an alkyl group, more preferably an alkyl group having 1 to 30 carbon atoms, and still more preferably an alkyl group having 1 to 20 carbon atoms. Specific examples thereof include a methyl group, an ethyl group, a propyl group, an isopropyl group, a butyl group, an isobutyl group, a tert-butyl group, a pentyl group, a cyclopentyl group, a hexyl group, and a cyclohexyl group, among which a methyl group and an ethyl group are preferable.

As the different silane compound, in addition to the compound represented by Formula (13) above, the compound represented by Formula (16) above, in particular, silane compounds having structures as shown below, can be used.

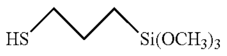 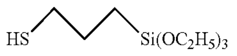

The content of the different silane compound in the silane coupling agent composition of the present invention is preferably from 0.1 to 0.9 and more preferably from 0.2 to 0.8 with respect to the total content of the first silane compound, the second silane compound, and the different silane compound by mass ratio.

[Rubber Composition]

The rubber composition of the present invention is characterized by comprising the silane coupling agent composition of the present invention, a diene-based rubber, and silica. The rubber composition of the present invention has excellent scorch resistance and uncrosslinked compound viscosity, and thus, a crosslinked product of a rubber composition having excellent viscoelastic properties, and a tire using the same which has an excellent balance of wet grip performance and low-fuel consumption can be provided. Such rubber composition can be preferably used for tires. Each component of the rubber composition will be described in detail below. The silane coupling agent composition is detailed above.

The total content of the first silane compound and the second silane compound in the rubber composition is preferably from 0.5 to 30 parts by mass, more preferably from 1 to 20 parts by mass, and still more preferably from 2 to 15 parts by mass with respect to 100 parts by mass of silica. As long as the total content of the first silane compound and the second silane compound is within the above-described numerical range, the rubber composition has excellent scorch resistance and uncrosslinked compound viscosity, and thus, a crosslinked product of a rubber composition having excellent viscoelastic properties, and a tire using the same which has an excellent balance of wet grip performance and low-fuel consumption can be provided.

The content of the different silane compound in the rubber composition is preferably from 0.01 to 20 parts by mass and more preferably from 0.05 to 10 parts by mass with respect to 100 parts by mass of silica.

(Diene-Based Rubber)

A diene-based rubber contained in the rubber composition of the present invention is not particularly limited, and a conventionally known diene-based rubber can be used. Examples of a diene-based rubber include isoprene-based rubbers and other diene-based rubbers. Examples of isoprene-based rubbers include natural rubber (NR), deproteinized natural rubber, and synthetic isoprene rubber. Examples of natural rubbers include natural rubber latex, technically specified rubber (TSR), ribbed smoked sheet (RSS), Gutta Percha, Eucommia-derived natural rubber, guayule-derived natural rubber, Russian dandelion-derived natural rubber, and plant-derived fermented rubber. Examples of natural rubbers also include modified natural rubbers obtained by modifying these natural rubbers such as epoxidized natural rubber, methacrylic acid-modified natural rubber, styrene-modified natural rubber, sulfonic acid-modified natural rubber, and zinc sulfonate-modified natural rubber. The ratio of cis/trans/vinyl in the double bond of natural rubber is not particularly limited, and any ratio can be suitably used. Examples of synthetic isoprene rubbers include copolymers of cis-1,4-isoprene, trans-1,4-isoprene, and 3,4-isoprene (so-called isoprene rubber (IR)). In addition, examples of those having a part of the structure of synthetic isoprene rubber include isoprene-butadiene rubber and halogenated isoprene rubber. According to the present invention, it is preferable to use isoprene rubber (IR) as a diene-based rubber, and it is more preferable to use synthetic isoprene rubber containing 75% or more of the cis-1,4-isoprene structure. The number average molecular weight and molecular weight distribution of the diene-based rubber are not particularly limited, but a number average molecular weight of from 500 to 3,000,000 and a molecular weight distribution of from 1.5 to 15 are preferable.

Examples of other diene-based rubbers include butadiene rubber, styrene-butadiene rubber, styrene-isoprene-butadiene rubber, Styrene-isoprene rubber, partially hydrogenated styrene-butadiene rubber, styrene-α-methylstyrene-butadiene rubber, and ethylene-propylene-diene rubber. Of these, it is preferable to use butadiene rubber and styrene-butadiene rubber.

The method for producing diene-based rubber is not particularly limited, and emulsion polymerization, solution polymerization, radical polymerization, anionic polymerization, cationic polymerization, and the like can be exemplified. In addition, the glass transition temperature is not particularly limited.

The content of diene-based rubber is preferably from 20% to 80% by mass, more preferably from 25% to 75% by mass, and still more preferably from 30% to 70% by mass with respect to the total solid mass of the rubber composition.

(Inorganic Material)

Examples of an inorganic material contained in the rubber composition of the present invention include silica, carbon black, calcium carbonate, titanium oxide, clay, and talc, which can be used singly or in combination. Of these, at least silica is used in the present invention because mechanical properties and heat resistance can be further improved. The content of the inorganic material is preferably from 0.1 to 500 parts by mass and more preferably from 1 to 300 parts by mass with respect to 100 parts by mass of the diene-based rubber.

Silica is not particularly limited, but for example, dry-process silica, wet-process silica, colloidal silica, and precipitated silica can be exemplified. Of these, wet-process silica containing hydrous silicic acid as the main component is preferable. These silicas may be used singly or in a combination of two or more thereof. The specific surface area of silica as described above is not particularly limited; however, improvements in reinforcing properties, wear resistance, exothermic properties, and the like are sufficiently achieved when the nitrogen adsorption-specific surface area (BET method) is in a range of usually from 10 to 400 $m^2/g$, preferably from 20 to 300 $m^2/g$ and more preferably from 120 to 190 $m^2/g$, which is preferable. The nitrogen adsorption-specific surface area used herein is a value determined by the BET method according to ASTM D3037-81. The amount of silica added is preferably from 1 to 300 parts by mass, more preferably from 5 to 200 parts by mass, and still more preferably from 10 to 150 parts by mass with respect to 100 parts by mass of the diene-based rubber.

Carbon black is appropriately selected and used depending on the application. In general, carbon black is classified into hard carbon and soft carbon based on the particle size. Soft carbon has low reinforcing properties for rubber, and hard carbon has high reinforcing properties for rubber. In particular, it is preferable to use hard carbon has high reinforcing properties for the rubber composition of the present invention. The amount of carbon black added is preferably from 1 to 300 parts by mass, more preferably from 5 to 200 parts by mass, and still more preferably from 10 to 150 parts by mass with respect to 100 parts by mass of the diene-based rubber. Carbon black may be added to the rubber composition or the silane coupling agent composition.

(Other Processing Aids)

The rubber composition of the present invention may comprise other processing aids such as a vulcanizing agent such as sulfur, a vulcanization accelerator, a vulcanization acceleration aid, an anti-aging agent, a coloring agent, a softener, various oils, an antioxidant, a filler, and a plasticizer within the scope without departing from the spirit of the present invention.

Examples of the vulcanizing agent include: sulfur-based vulcanizing agents such as powdered sulfur, precipitated sulfur, highly dispersible sulfur, surface-treated sulfur, insoluble sulfur, dimorpholine disulfide, and alkylphenol disulfide; zinc oxide, magnesium oxide, litharge, p-quinonedioxam, p-dibenzoylquinonedioxime, tetrachloro-p-benzoquinone, poly-p-dinitrobenzene, methylenedianiline, phenol resin, brominated alkylphenol resin, and chlorinated alkylphenol resin. The content of the vulcanizing agent is preferably from 0.1 to 10 parts by mass and more preferably from 0.5 to 5 parts by mass with respect to 100 parts by mass of the diene-based rubber.

Examples of the vulcanization accelerator include: thiuram-based vulcanization accelerators such as tetramethylthiuram disulfide (TMTD), tetraethylthiuram disulfide (TETD), and tetramethylthiuram monosulfide (TMTM); aldehyde ammonia-based vulcanization accelerators such as hexamethylenetetramine; guanidine-based vulcanization accelerators such as diphenylguanidine; thiazole-based vulcanization accelerators such as 2-mercaptobenzothiazole (MBT) and dibenzothiazyl disulfide (DM); sulfenamide-based vulcanization accelerators such as N-cyclohexyl-2-benzothiazylsulfenamide (CBS) and N-t-butyl-2-benzothiazylsulfenamide (BBS); and dithiocarbamate-based vulcanization accelerators such as zinc dimethyldithiocarbamate (ZnPDC). The content of the vulcanization accelerator is preferably from 0.01 to 10 parts by mass and more preferably from 0.1 to 5 parts by mass with respect to 100 parts by mass of the diene-based rubber.

Examples of the vulcanization acceleration aid include: fatty acids such as acetyl acid, propionic acid, butanoic acid, stearic acid, acrylic acid, and maleic acid; fatty acid zincs such as zinc acetylate, zinc propionate, zinc butanoate, zinc stearate, zinc acrylate, and zinc maleate; and zinc oxides. The content of the vulcanization acceleration aid is preferably from 0.01 to 10 parts by mass and more preferably from 0.1 to 5 parts by mass with respect to 100 parts by mass of the diene-based rubber.

Examples of an anti-aging agent include hindered phenol-based compounds and aliphatic and aromatic hindered amine-based compounds. The content of the anti-aging agent is preferably from 0.01 to 10 parts by mass and more preferably from 0.1 to 5 parts by mass with respect to 100 parts by mass of the diene-based rubber.

Examples of the antioxidant include butyl hydroxytoluene (BHT) and butyl hydroxyanisole (BHA). The content of the antioxidant is preferably from 0.1 to 10 parts by mass and more preferably from 0.5 to 5 parts by mass with respect to 100 parts by mass of the diene-based rubber.

Examples of the coloring agent include: inorganic pigments such as titanium dioxide, zinc oxide, ultramarine, red iron oxide, lithopone, lead, cadmium, iron, cobalt, aluminum, hydrochloride, and sulfate; azo pigments; and copper phthalocyanine pigments. The content of the coloring agent is preferably from 0.1 to 10 parts by mass and more preferably from 0.5 to 5 parts by mass with respect to 100 parts by mass of the diene-based rubber.

According to the present invention, other processing aids can be used as a rubber composition obtained by kneading with a known rubber kneader such as a roll kneader, a Banbury (registered trademark) mixer, a kneader, or the like and carrying out vulcanization under arbitrary conditions. The amounts of the other processing aids to be added can also be a conventional usual amount to be added within the scope without departing from the spirit of the present invention.

[Method for Producing Rubber Composition]

The method for producing the rubber composition of the present invention comprises a step of kneading the silane coupling agent, the diene-based rubber, and the inorganic material described above. The method for producing the rubber composition of the present invention comprises preferably a step of kneading the silane coupling agent, the diene-based rubber, the inorganic material, and the vulcanization acceleration aid described above.

The method for producing the rubber composition of the present invention further comprises preferably a step of kneading the vulcanizing agent. More preferably, the method may comprise a step of kneading the vulcanizing agent and the vulcanization accelerator described above.

In each step described above, the above-described other processing aids can be compounded with the rubber composition within the scope without departing from the spirit of the present invention.

In producing the rubber composition, a conventionally known kneader can be used, and the kneading temperature and time, order of compounding, and the like can be appropriately selected.

[Crosslinked Product of Rubber Composition]

A crosslinked product of the rubber composition can be produced using the rubber composition of the present invention according to a conventionally known method and technical common knowledge widely known to those skilled in the art. For example, the crosslinked product can be produced by extruding the rubber composition, molding the extruded product using a molding machine, and then performing heating and pressurization using a vulcanizer so as to form crosslinks.

[Tire]

The tire of the present invention comprises a crosslinked product of the rubber composition of the present invention. The tire of the present invention can be produced using the above-described rubber composition according to a conventionally known method and technical common knowledge widely known to those skilled in the art. For example, the tire can be produced by extruding the rubber composition, molding the extruded product using a tire molding machine, and then performing heating and pressurization using a vulcanizer so as to form crosslinks. By producing a tire using the rubber composition of the present invention, it is possible to improve wet grip properties and low-fuel consumption in tire performance in a well-balanced manner.

The use of the tire is not particularly limited, but passenger car tires, heavy-duty tires, motorcycle tires, studless tires, and the like can be exemplified.

The shape, structure, size, and material of the tire are not particularly limited and can be appropriately selected according to the purpose. In addition, the rubber composition can be applied to each part of the tire. The part of the tire to which the composition is applied is not particularly limited. The tread, carcass, sidewall, inner liner, undertread, belt portion, and the like of the tire can be appropriately selected according to the purpose. According to the present invention, a pneumatic tire using the rubber composition for tire tread is preferable.

EXAMPLES

The present invention will be described in more detail below with reference to Examples, but the present invention is not limited to these Examples.

Preparation Example 1: Synthesis of Silane Compound 1 (VNB-SSi)

A 100-mL three-necked flask was equipped with a ball stopper, a three-way stopcock connected to a vacuum line or a dry nitrogen line, and a septum. A stirrer bar was then placed in the flask, and while heating with a drier, degassing and nitrogen replacement in the system were repeated 10 times so as to create a normal-pressure nitrogen atmosphere. A syringe was used to inject 27.5 g (0.225 mol) of 2-vinylnorbornene (VNB) into the flask, and 0.074 g (0.45 mmol) of azobisisobutyronitrile was added under a nitrogen atmosphere, followed by nitrogen bubbling for 20 minutes. Next, 10.7 g (0.045 mol) of mercaptopropyltriethoxysilane was aspirated with a gas-tight syringe and the syringe was attached to a metering pump. The pump was set to drip the total amount in 3 hours. Thereafter, the connection was sealed with silicone grease. The needle tip of the gas-tight syringe was introduced through the septum into the flask. The flask was immersed in an oil bath. The bath temperature was gradually increased, and when the internal temperature reached 50° C., the metering pump was activated such that mercaptopropyltriethoxysilane was added dropwise to react. After 2 hours from the completion of the dropwise addition of the total amount, the oil bath was removed from the flask, and the flask was allowed to stand to room temperature. Excess VNB was then distilled off under reduced pressure, thereby obtaining 37.4 g of the colorless clear liquid of interest. FIG. 1 shows the results of $^{1}$H-NMR measurement of the obtained compound. $^{1}$H-NMR and $^{13}$C-NMR measurements confirmed that the silane introduction rate was 100% and that the double bond of the norbornene ring had disappeared.

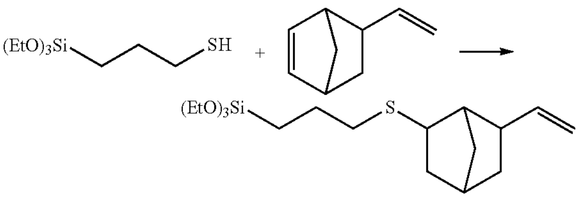

(1A)

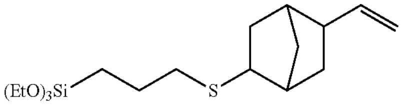

(1B)

[Detection of Stereoisomers of Silane Compound 1]

Figure 2:
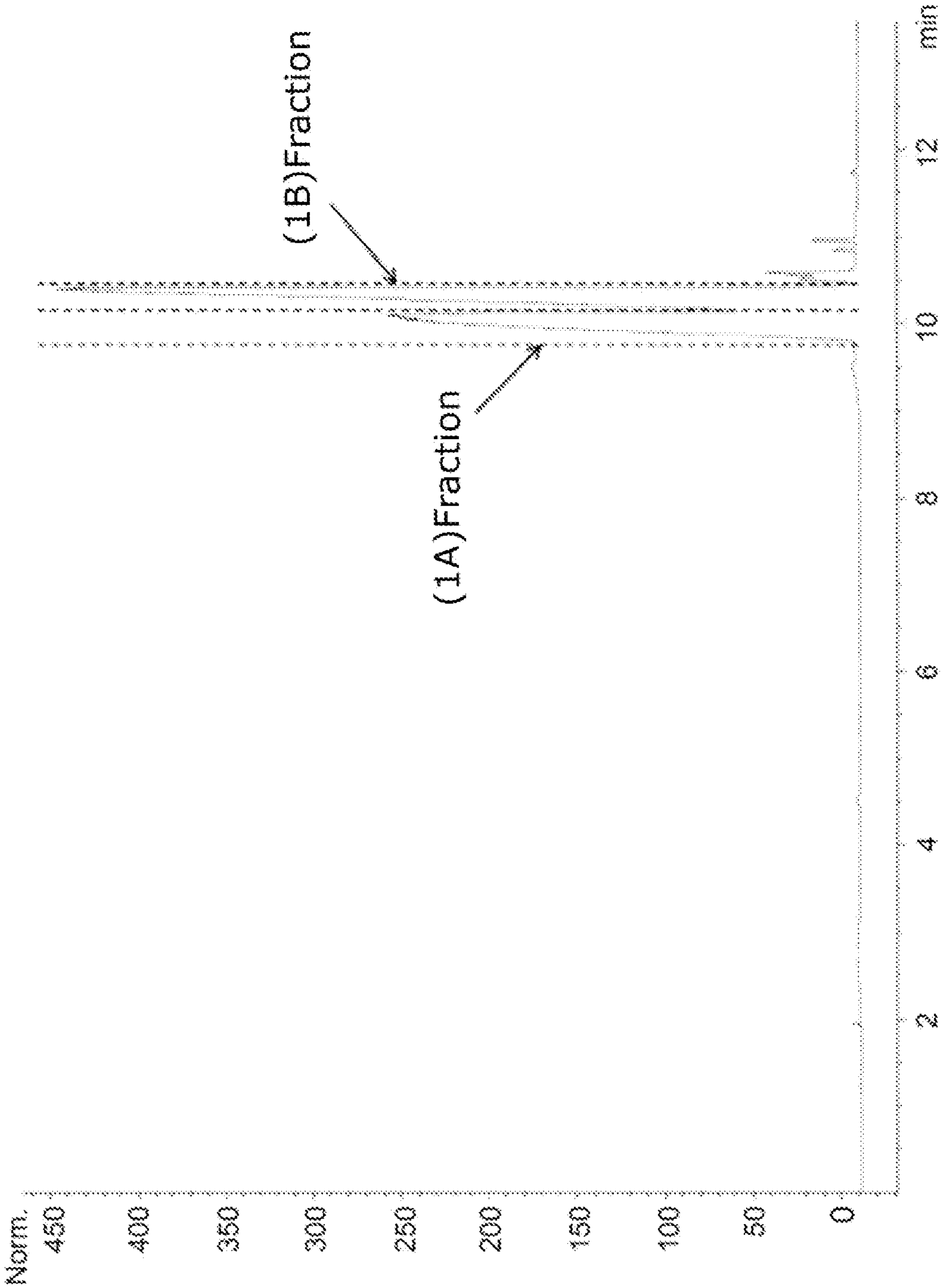
FIG. 2 is a chromatogram showing that the silane compound 1 synthesized in Preparation Example 1 was fractionated into a fraction (1A) and a fraction (1B) by gas chromatography, and each fraction was collected.
Figure 3:
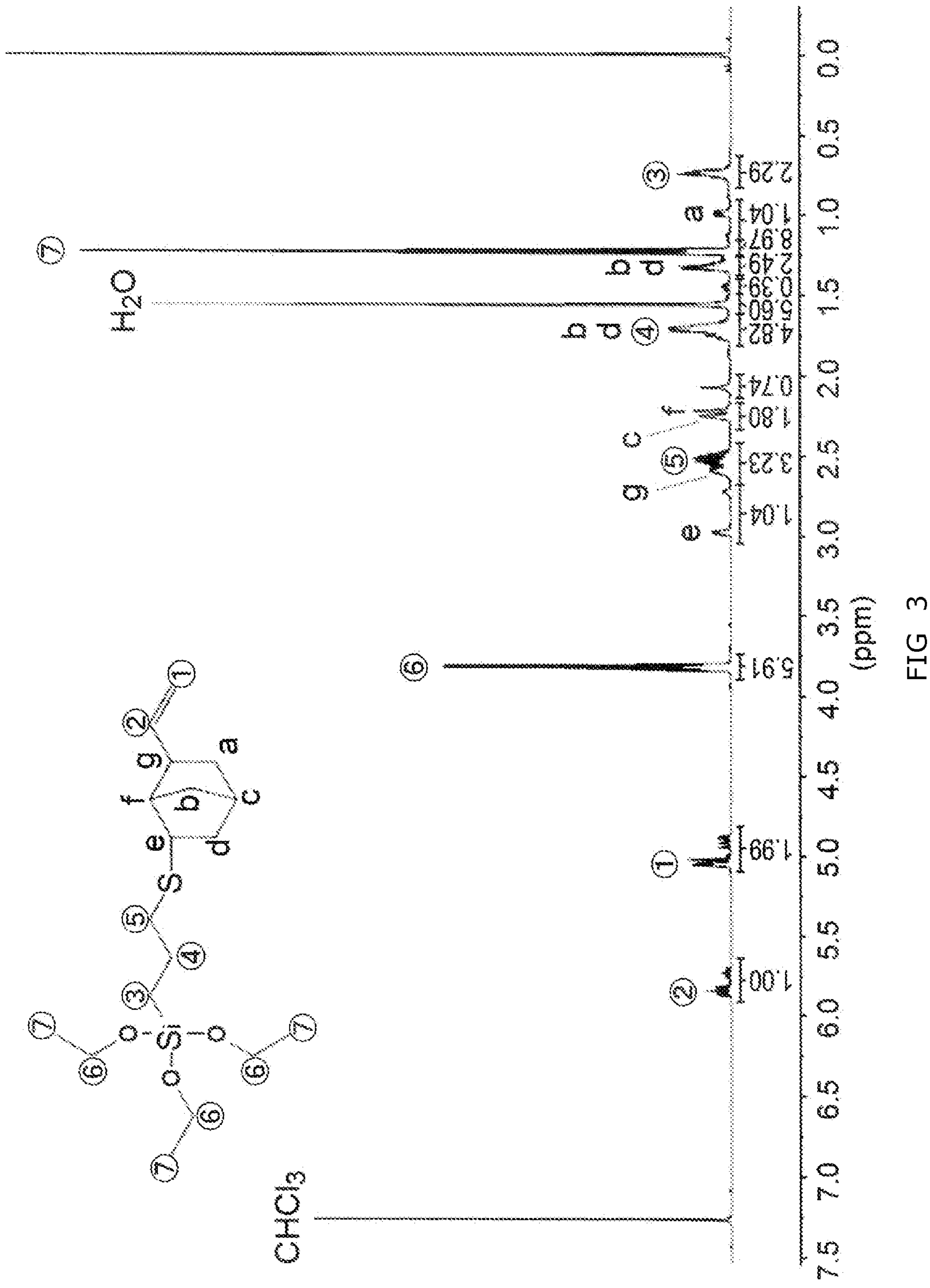
FIG. 3 is a $^1$H-NMR chart of the fraction (1A) of the silane compound 1 synthesized in Preparation Example 1. The peaks indicated by a to g and the circled integers from 1 to 7 indicate the peaks of protons bound to the respective carbon atoms (shown in FIG. 3) of the compound represented by Formula (1A).
Figure 4:
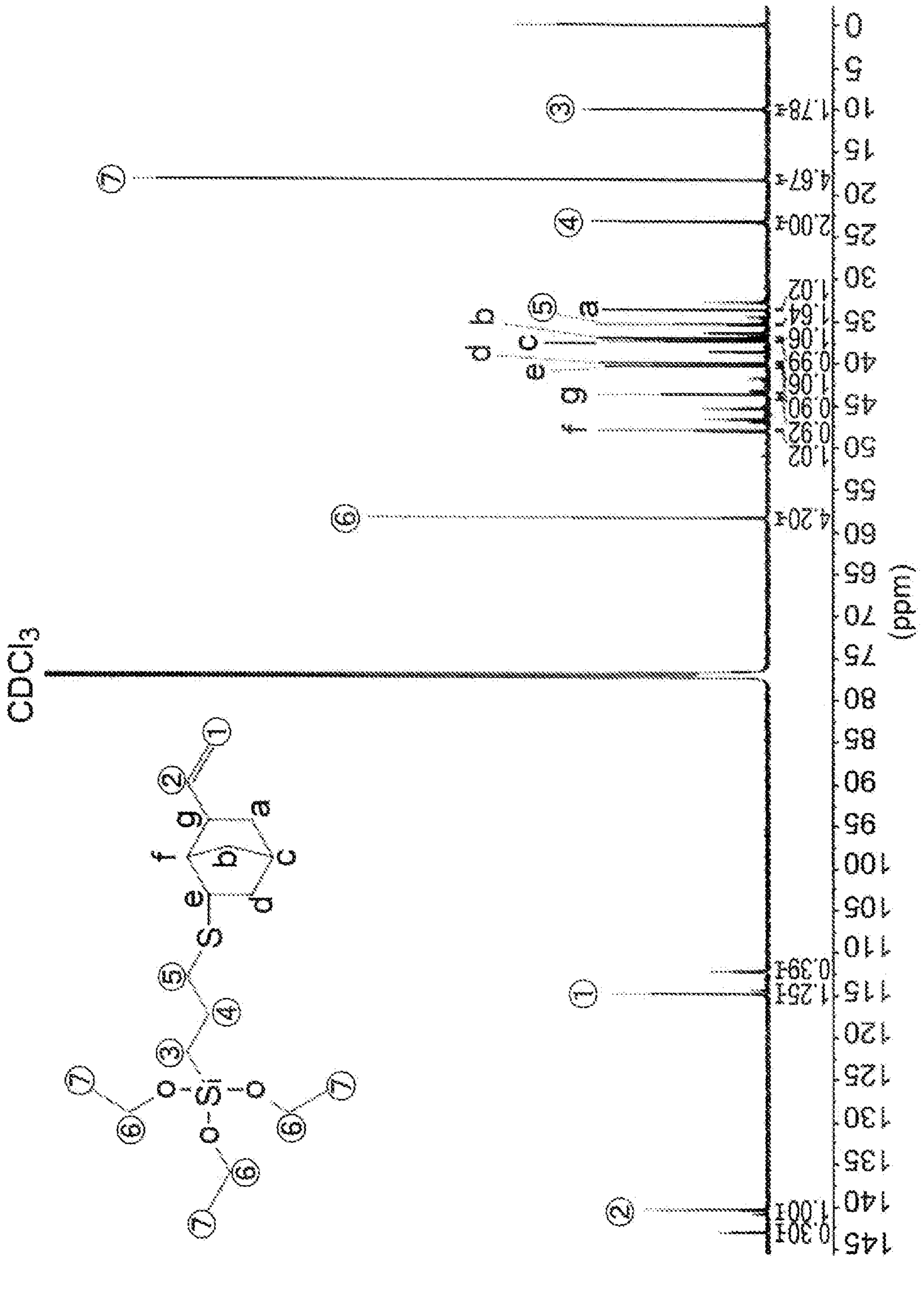
FIG. 4 is a $^{13}$C-NMR chart of the fraction (1A) of the silane compound 1 synthesized in Preparation Example 1. The peaks indicated by a to g and the circled integers from 1 to 7 indicate the peaks of the respective carbon atoms (shown in FIG. 4) of the compound represented by Formula (1A).
Figure 5:
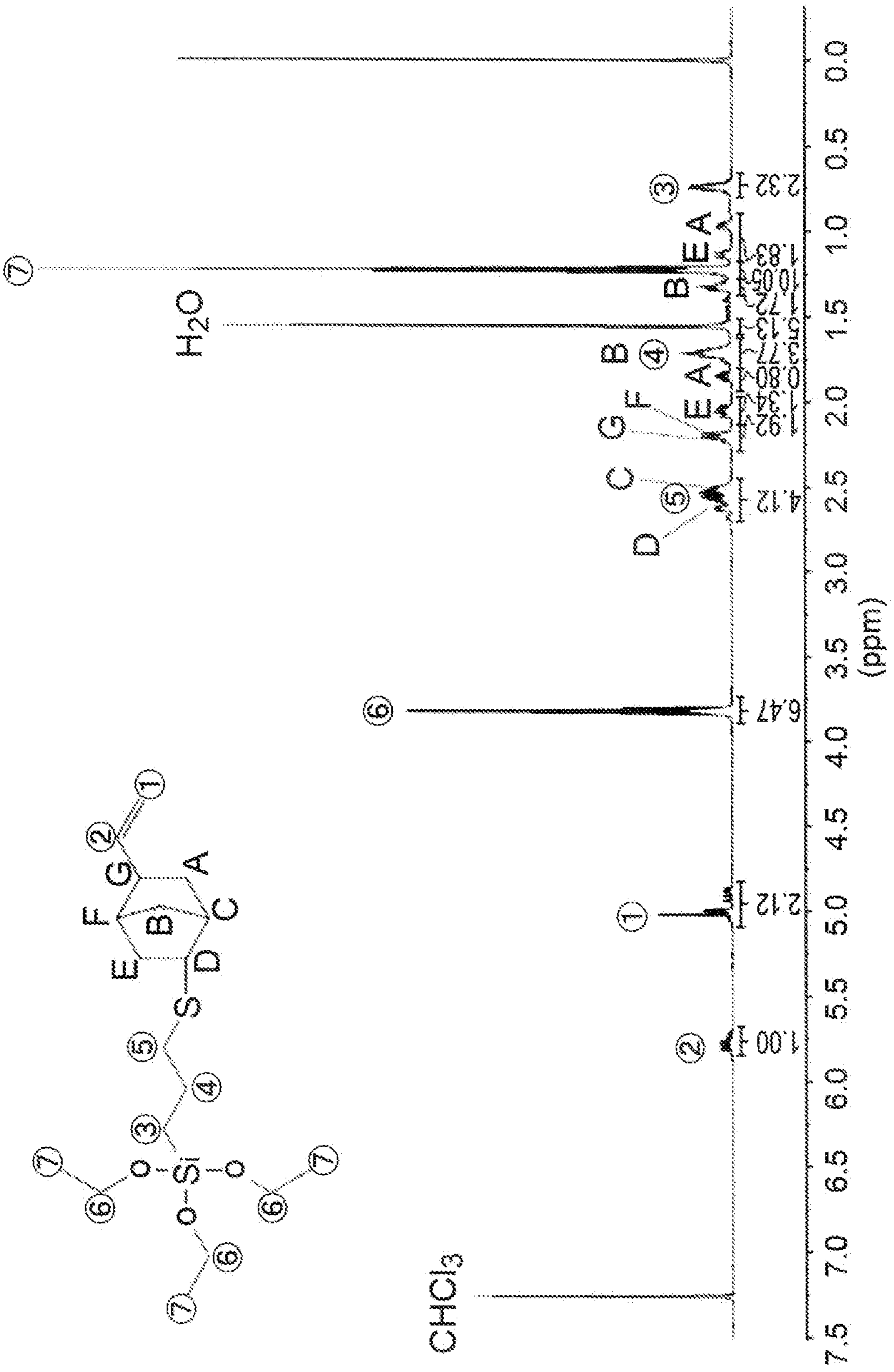
FIG. 5 is a $^1$H-NMR chart of the fraction (1B) of the silane compound 1 synthesized in Preparation Example 1. The peaks indicated by A to G and the circled integers from 1 to 7 indicate the peaks of protons bound to the respective carbon atoms (shown in FIG. 5) of the compound represented by Formula (1B).
Figure 6:
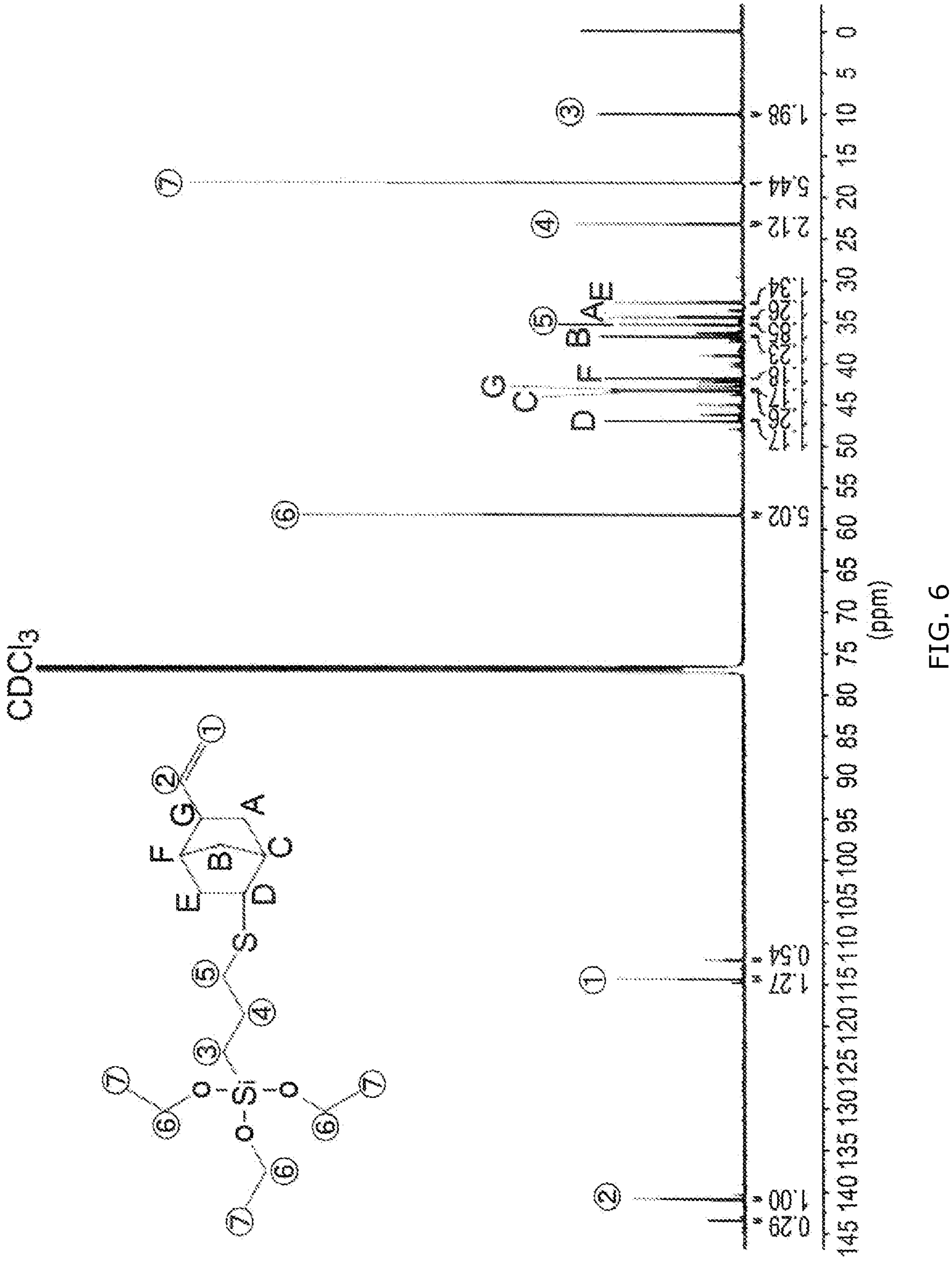
FIG. 6 is a $^{13}$C-NMR chart of the fraction (1B) of the silane compound 1 synthesized in Preparation Example 1. The peaks indicated by A to G and the circled integers from 1 to 7 indicate the peaks of protons bonded to the respective carbon atoms (shown in FIG. 6) of the compound represented by Formula (1B).

The obtained silane compound 1 was fractionated by gas chromatography so as to collect a fraction containing a large amount of the compound represented by the above Formula (1A) ("fraction (1A)") and a fraction containing a large amount of the compound represented by the above Formula (1B) ("fraction (1B)") (FIG. 2). The $^{1}$H-NMR measurement results of the fraction (1A) are shown in FIG. 3, and the $^{13}$C-NMR measurement results of the fraction (1A) are shown in FIG. 4. In addition, the $^{1}$H-NMR measurement results of the fraction (1B) are shown in FIG. 5, and the 13C-NMR measurement results of the fraction (1B) are shown in FIG. 6. It was observed that the peak of proton attached to the carbon atom directly bound to the norbornene ring of the double bond of the vinyl group in the chemical structures represented by Formulas (1A) and (1B) (the carbon atom denoted by the circled integer of 2 in FIG. 3 or FIG. 5) was split. This data suggested the presence of two stereoisomers, i.e., an isomer in which the vinyl group bound to the norbornene ring extends forward in the drawings in the same way as the crosslinked structure of the norbornene ring (syn-isomer) and an isomer in which the vinyl group bound to the norbornene ring extends backward in the drawings opposite to the crosslinked structure of the norbornene ring (anti-isomer). Similarly, the presence of two stereoisomers, i.e., an isomer in which the sulfur group bound to the norbornene ring extends forward in the drawings in the same way as the crosslinked structure of the norbornene ring (syn-isomer) and an isomer in which the sulfur group bound to the norbornene ring extends backward in the drawings opposite to the crosslinked structure of the norbornene ring (anti-isomer), is suggested. From the above, it is surmised that the obtained silane compound 1 is a mixture of eight stereoisomers represented by the following formulas.

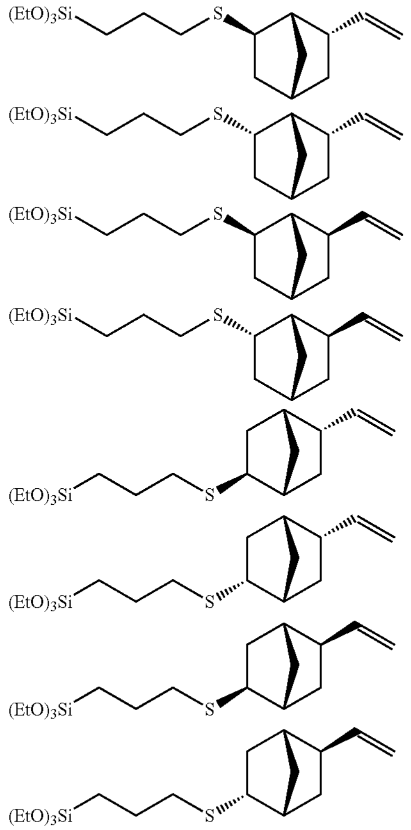

Preparation Example 2: Synthesis of Silane Compound 2 (VNB-2SSi)

A 50-mL three-necked flask was equipped with a ball stopper, a three-way stopcock connected to a vacuum line or a dry nitrogen line, and a septum. A stirrer bar was then placed in the flask, and while heating with a drier, degassing and nitrogen replacement in the system were repeated 10 times so as to create a normal-pressure nitrogen atmosphere. A syringe was used to inject 5.2 g (0.043 mol) of 2-vinylnorbornene (VNB) and 20.3 g (0.085 mol) of mercaptopropyltriethoxysilane into the flask, and 0.14 g (0.85 mmol) of azobisisobutyronitrile was added under a nitrogen atmosphere, followed by nitrogen bubbling for 20 minutes. Thereafter, the connection was sealed with silicone grease. The flask was immersed in an oil bath. The bath temperature was gradually increased to 50° C. such that the reaction was carried out for 13 hours, and then the temperature was further raised to 70° C. such that the reaction was carried out for 5 hours. Next, mercaptopropyltriethoxysilane was added twice (1st time: 0.10 g (0.85 mmol); 2nd time: 0.26 g (2.13 mmol)) and reacted at 70° C. for 5 hours each time, and then allowed to cool to room temperature, thereby obtaining 25.0 g of the colorless to pale yellow clear liquid of interest.

Figure 7:
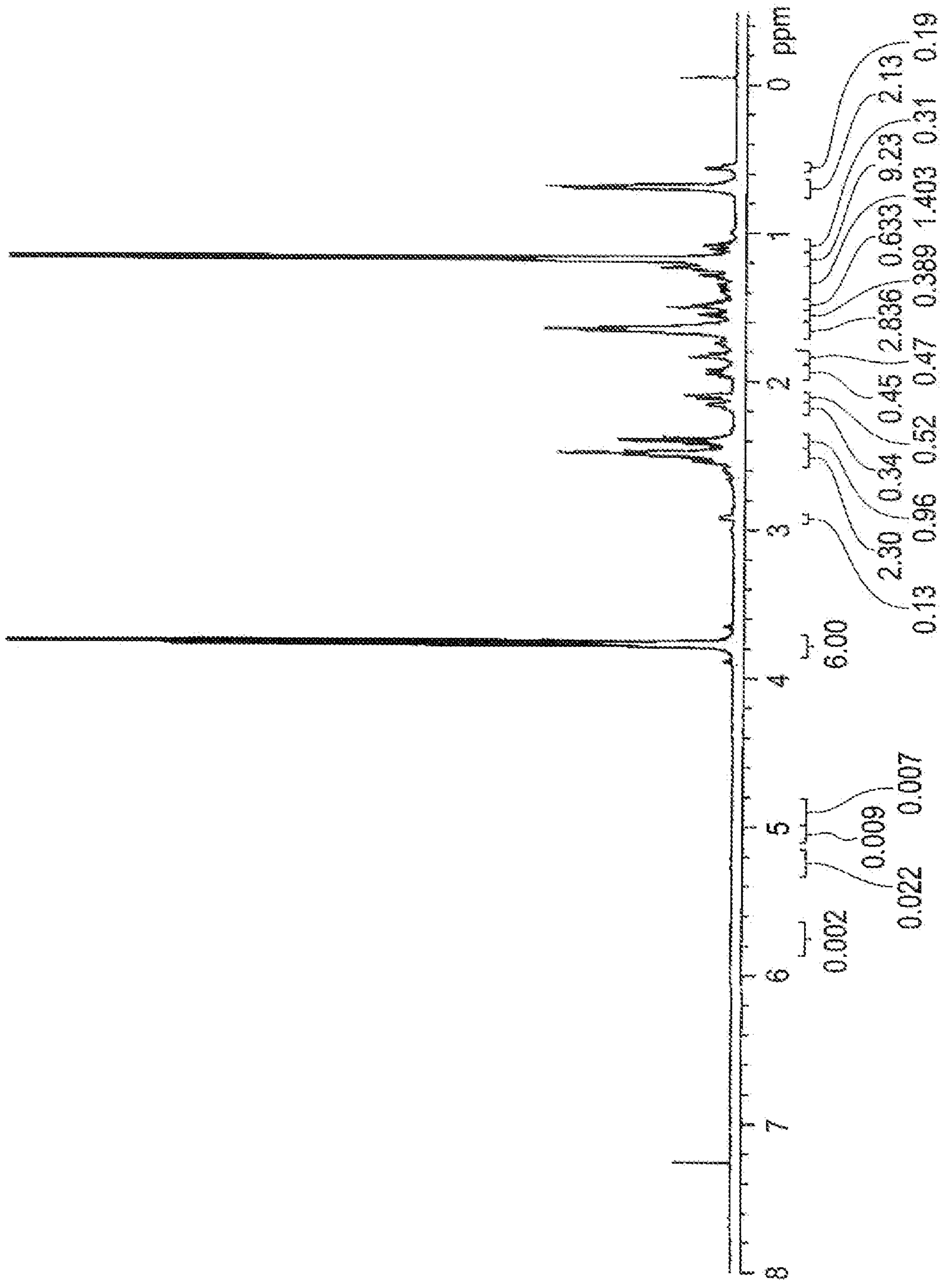
FIG. 7 is a $^1$H-NMR chart of silane compound 2 synthesized in Preparation Example 2.

FIG. 7 shows the results of $^1$H-NMR measurement of the obtained compound. $^1$H-NMR measurement confirmed that the silane introduction rate was 100% and that the double bonds of both the norbornene ring and the vinyl group had disappeared.

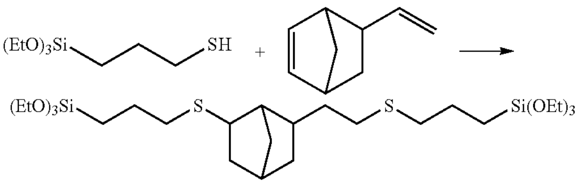

(2A)

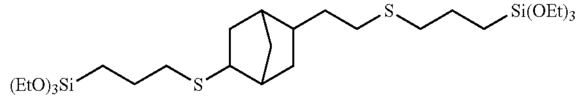

(2B)

[Detection of Stereoisomers of Silane Compound 2]

FIG. 7 shows the results of $^1$H-NMR measurement of the obtained silane compound 2. $^1$H-NMR measurement confirmed that the double bond of the vinyl group had disappeared. Here, it is surmised that the silane compound 2 is obtained by reacting the vinyl groups of the eight stereoisomers (1-adducts) of the silane compound 1 synthesized in Preparation Example 1 with mercaptosilane, thereby forming a 2-adduct. It is surmised that at that time, the addition to the vinyl group occurs only at the 1-position (outside) of the vinyl group with little steric hindrance, and the addition to the vinyl group maintains the stereoisomerism of the silane compound 1 as it is. From the above, it is surmised that the obtained silane compound 2 is a mixture of eight stereoisomers represented by the following formulas.

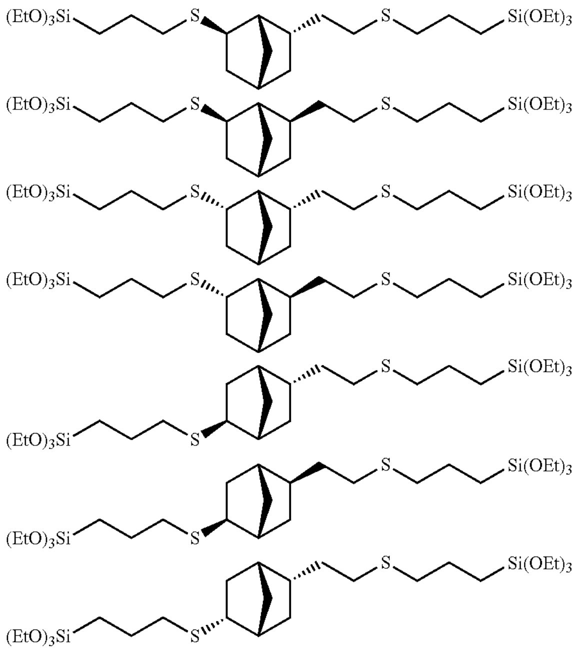

-continued

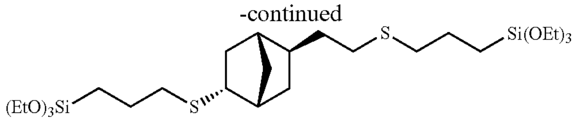

Example 1-1

(Preparation of Silane Coupling Agent Composition, Rubber Composition, and Rubber Sheet)

First, the total amount of the silane compound 1 (VNB-SSi) and the total amount of the silane compound 2 (VNB-255i) were mixed, thereby obtaining a silane coupling agent composition. Subsequently, the following components were kneaded using a 100-mL kneader (Labo-plastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 160° C. for 30 minutes, thereby obtaining a vulcanized rubber sheet having a thickness of 2 mm.

- Styrene-butadiene rubber (trade name: NS616 manufactured by ZS Elastomers Co., Ltd.): 70 parts by mass
- Butadiene rubber (trade name: UBEPOL BR150 manufactured by Ube Industries, Ltd.): 30 parts by mass
- Silica AQ (trade name: Nipsil AQ manufactured by Tosoh Corporation): 60 parts by mass
- Zinc oxide No. 3 (trade name: Ginrei R manufactured by Toho Zinc Co., Ltd.): 3 parts by mass
- Stearic acid (trade name: Stearic acid 300 manufactured by New Japan Chemical Co., Ltd.): 1 part by mass
- Anti-aging agent (trade name: NOCLAK 6C manufactured by OUCHI SHINKO CHEMICAL INDUSTRIAL CO., LTD.): 1 part by mass
- Silane compound 1 (VNB-SSi) (Preparation Example 1): 4.56 parts by mass
- Silane compound 2 (VNB-255i) (Preparation Example 2): 0.24 parts by mass
- Sulfur (5% oil-treated sulfur manufactured by Hosoi Chemical Industry Co., Ltd): 2.14 parts by mass
- Vulcanization accelerator (trade name: NOCSELA CZ manufactured by OUCHI SHINKO CHEMICAL INDUSTRIAL CO., LTD.): 2.3 part by mass
- Vulcanization accelerator (trade name: NOCSELA D manufactured by OUCHI SHINKO CHEMICAL INDUSTRIAL CO., LTD.): 1.1 parts by mass

Example 1-2

A silane coupling agent composition, a rubber composition, and a rubber sheet were obtained in the same manner as in Example 1-1 except that the amount of the silane compound 1 (VNB-SSi) added was changed to 4.32 parts by mass, and the amount of the silane compound 2 (VNB-2SSi) added was changed to 0.48 parts by mass.

Example 1-3

A silane coupling agent composition, a rubber composition, and a rubber sheet were obtained in the same manner as in Example 1-1 except that the amount of the silane compound 1 (VNB-SSi) added was changed to 4.08 parts by mass, and the amount of the silane compound 2 (VNB-2SSi) added was changed to 0.72 parts by mass.

Example 1-4

A silane coupling agent composition, a rubber composition, and a rubber sheet were obtained in the same manner as in Example 1-1 except that the amount of the silane compound 1 (VNB-SSi) added was changed to 3.60 parts by mass, and the amount of the silane compound 2 (VNB-2SSi) added was changed to 1.20 parts by mass.

Example 1-5

A silane coupling agent composition, a rubber composition, and a rubber sheet were obtained in the same manner as in Example 1-1, except that the amount of the silane compound 1 (VNB-SSi) added was changed to 3.06 parts by mass, the amount of the silane compound 2 (VNB-2SSi) added was changed to 0.54 parts by mass, 1.20 parts by mass of the different silane compound (Si69) was added, and the amount of sulfur added was changed to 1.86 parts by mass.

Comparative Example 1-1

A silane coupling agent composition, a rubber composition, and a rubber sheet were obtained in the same manner as in Example 1-1, except that the silane compound 1 (VNB-SSi) and the silane compound 2 (VNB-2SSi) were not added, 4.80 parts by mass of the different silane compound (Si69) was added, and the amount of sulfur added was changed to 1.00 parts by mass.

Comparative Example 1-2

A silane coupling agent composition, a rubber composition, and a rubber sheet were obtained in the same manner as in Example 1-1, except that the silane compound 1 (VNB-SSi) was not added, and the amount of the silane compound 2 (VNB-2SSi) added was changed to 4.80 parts by mass.

[Evaluation of Physical Properties]

The physical properties of the rubber sheets obtained in Examples 1-1 to 1-5 and Comparative Examples 1-1 to 1-2 were evaluated by the following methods.

(Viscoelasticity)

For the rubber sheets obtained in Examples 1-1 to 1-5 and Comparative Examples 1-1 to 1-2, tan δ was obtained at measurement temperatures of 0° C. and 60° C. using a viscoelasticity measuring system (REOGEL E-4000 manufactured by UBM) according to NS K 6394 under conditions of a distortion of about 0.1% and a frequency of 10 Hz, and a tan δ balance (=tan δ (0° C.)/tan δ (60° C.)) was calculated from each resulting value. The greater the tan δ balance, the better the viscoelastic properties of the rubber sheet, indicating an excellent balance of wet grip performance and low-fuel consumption as a tire.

(Unvulcanized Compound Viscosity)

The Mooney viscosities of the rubber compositions obtained in Examples 1-1 to 1-5 and Comparative Examples 1-1 and 1-2 above were determined according to JIS K6300 using a Mooney viscometer with an L-type rotor (diameter: 38.1 mm; thickness: 5.5 mm) under conditions of a preheating time of 1 minute, a rotor rotation time of 4 minutes, 100° C., and 2 rpm. The smaller the measurement result, the smaller the viscosity of the rubber composition, indicating excellent workability.

(Scorch Resistance)

Using a rotorless Mooney viscometer manufactured by Toyo Seiki Co., Ltd. according to JIS K6300, the unvulcanized rubber composition was preheated at 125° C. for 1 minute, and then the time t5 required for the viscosity to increase by 5 Mooney units from the minimum viscosity Vm was measured. The larger the measurement result, the longer the scorch time, indicating excellent workability of the rubber composition.

Table 1 shows the above measurement results. The measured values are represented by indices of the values in Comparative Example 1-1, each being 100.

TABLE 1

| | | Example 1-1 | Example 1-2 | Example 1~3 | Example 1-4 | Example 1-5 | Comparative Example 1-1 | Comparative Example 1-2 |
|---|---|---|---|---|---|---|---|---|
| Rubber composition formulation (parts by mass) | SBR | 70 | 70 | 70 | 70 | 70 | 70 | 70 |
| | BR | 30 | 30 | 30 | 30 | 30 | 30 | 30 |
| | Silica AQ | 60 | 60 | 60 | 60 | 60 | 60 | 60 |
| | Zinc oxide No. 3 | 3 | 3 | 3 | 3 | 3 | 3 | 3 |
| | Stearic acid | 1 | 1 | 1 | 1 | 1 | 1 | 1 |
| | Anti-aging agent (NOCLAK 6C) | 1 | 1 | 1 | 1 | 1 | 1 | 1 |
| | Silane compound 1 (VNB-SSi) | 4.56 | 4.32 | 4.08 | 3.60 | 3.06 | 0 | 0 |
| | Silane compound 2 (VNB-2SSi) | 0.24 | 0.48 | 0.72 | 1.20 | 0.54 | 0 | 4.80 |
| | Different silane compound (Si69) | 0 | 0 | 0 | 0 | 1.20 | 4.80 | 0 |
| | Sulfur (5% oil-treated) | 2.14 | 2.14 | 2.14 | 2.14 | 1.86 | 1.00 | 1.00 |
| | Vulcanization accelerator (NOCSELA CZ) | 2.3 | 2.3 | 2.3 | 2.3 | 2.3 | 2.3 | 2.3 |
| | Vulcanization accelerator (NOCSELA D) | 1.1 | 1.1 | 1.1 | 1.1 | 1.1 | 1.1 | 1.1 |
| | Ratio of silane compound 2 to the total of silane compounds 1 and 2 (% by mass) | 5 | 10 | 15 | 25 | 15 | 0 | 100 |
| Viscoelasticity | tan δ (0° C.) (index) | 125 | 124 | 121 | 124 | 118 | 100 | 122 |
| | tan δ (60° C.) (index) | 78 | 80 | 77 | 78 | 78 | 100 | 76 |
| | tan δ (0° C.)/tan δ (60° C.) (index) | 160 | 155 | 157 | 160 | 151 | 100 | 160 |
| Unvulcanized compound viscosity | ML1 + 4 (100° C.) (index) | 74 | 74 | 76 | 76 | 81 | 100 | 93 |
| Scorch resistance | T5 125° C. (index) | 149 | 146 | 147 | 148 | 144 | 100 | 134 |

The results of Examples 1-1 to 1-5 and Comparative Examples 1-1 and 1-2 show that by using a silane coupling agent composition comprising the silane compound 1 and the silane compound 2, the rubber composition had improved scorch resistance and improved viscosity of the unvulcanized compound, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

Example 2-1

(Preparation of Silane Coupling Agent Composition, Rubber Composition, and Rubber Sheet)

First, the total amount of the silane compound 1 (VNB-SSi) and the total amount of the silane compound 2 (VNB-2SSi) were mixed, thereby obtaining a silane coupling agent composition. Subsequently, the following components were kneaded using a 100-mL kneader (Labo-plastomill manufactured by Toyo Seiki Co., Ltd.), thereby obtaining a rubber composition. Details of the kneading operation performed are as follows: (i) to (iii).

(i) Mixer kneading: Natural rubber was put into a closed pressure kneader heated to 150° C. and masticated at 30 rpm for 1 minute. Then, the one-half amount of the mixture of silica, zinc oxide, stearic acid, and an anti-aging agent which was weighed out and the total amount of the silane coupling agent composition prepared above were added. Kneading was carried out for 1 minute and 30 seconds by increasing the rotational speed to 50 rpm. Further, the remaining half amount of the mixture of silica, zinc oxide, stearic acid, and kneading was continued for 1 minute and 30 seconds. The ram (floating weight) was then raised, the surrounding powder of the mixture of silica, zinc oxide, stearic acid, and an anti-aging agent was added to the kneaded material using a brush, and kneading was further continued for 1 minute. The ram was then raised again, the surrounding powder of the mixture of silica, zinc oxide, stearic acid, and an anti-aging agent was added to the kneaded material using a brush, and the kneaded material was further kneaded for 3 minutes and discharged.

(ii) Remilling: In order to improve the dispersion of silica, the kneaded material was discharged to a closed pressure kneader heated to 120° C., and the kneaded material, the temperature of which had dropped sufficiently, was further kneaded at 50 rpm for 2 minutes and then discharged.

(iii) Roll kneading (addition of vulcanization system): After the kneaded material was discharged and the temperature was sufficiently lowered, sulfur, a vulcanization accelerator, and the like were added to the kneaded material and kneaded with two rolls, thereby obtaining a rubber composition.

Thereafter, the obtained unvulcanized rubber composition was placed in a mold (150 mm×150 mm×2 mm) and heated and pressed at 160° C. for 30 minutes, thereby obtaining a vulcanized rubber sheet having a thickness of 2 mm.

Synthetic isoprene rubber (trade name: IR-2200 manufactured by Zeon Corporation): 100 parts by mass Silica AQ (trade name: Nipsil AQ manufactured by Tosoh Corporation): 60 parts by mass Zinc oxide No. 3 (trade name: Ginrei R manufactured by Toho Zinc Co., Ltd.): 3 parts by mass Stearic acid (trade name: Stearic acid 300 manufactured by New Japan Chemical Co., Ltd.): 1 part by mass Anti-aging agent (trade name: NOCLAK 6C manufactured by OUCHI SHINKO CHEMICAL INDUSTRIAL CO., LTD.): 1 part by mass Silane compound 1 (VNB-SSi) (Preparation Example 1): 4.27 parts by mass Silane compound 2 (VNB-2SSi) (Preparation Example 2): 0.53 parts by mass Sulfur (5% oil-treated sulfur manufactured by Hosoi Chemical Industry Co., Ltd): 3.14 parts by mass Vulcanization accelerator (trade name: NOCSELA CZ manufactured by OUCHI SHINKO CHEMICAL INDUSTRIAL CO., LTD.): 1.00 part by mass Vulcanization accelerator (trade name: NOCSELA D manufactured by OUCHI SHINKO CHEMICAL INDUSTRIAL CO., LTD.): 0.5 parts by mass

Comparative Example 2-1

A silane coupling agent composition, a rubber composition, and a rubber sheet were obtained in the same manner as in Example 2-1, except that the silane compound 1 (VNB-SSi) and the silane compound 2 (VNB-2SSi) were not added, 4.80 parts by mass of the different silane compound (Si69) was added, and the amount of sulfur added was changed to 2.00 parts by mass.

[Evaluation of Physical Properties]

The viscoelasticity of the rubber sheets obtained in Example 2-1 and Comparative Example 2-1, and the scorch resistance and unvulcanized compound viscosity of the rubber compositions obtained in the same Example and Comparative Example were evaluated by the above-described method in the same manner as in Example 1-1. Table 2 shows the above measurement results and calculation results (tan δ balance). Each measured value and each calculated value are represented by indices of the values in Comparative Example 2-1 each being 100.

TABLE 2

| | | Example 2-1 | Comparative Example 2-1 |
|---|---|---|---|
| Rubber composition formulation (parts by mass) | Synthetic isoprene rubber (IR-2000) | 100 | 100 |
| | Silica AQ | 60 | 60 |
| | Zinc oxide No. 3 | 3 | 3 |
| | Stearic acid | 1 | 1 |
| | Anti-aging agent (NOCLAK 6C) | 1 | 1 |
| | Silane compound 1 (VNB-SSi) | 4.27 | 0 |
| | Silane compound 2 (VNB-2SSi) | 0.53 | 0 |
| | Different silane compound (Si69) | 0 | 4.80 |
| | Sulfur (5% oil-treated) | 3.14 | 2.00 |
| | Vulcanization accelerator (NOCSELA CZ) | 1.00 | 1.00 |
| | Vulcanization accelerator (NOCSELA D) | 0.5 | 0.5 |
| | Ratio of silane compound 2 to the total of silane compounds 1 and 2 (% by mass) | 11 | 0 |
| Viscoelasticity | tan δ (0° C.) (index) | 95 | 100 |
| | tan δ (60° C.) (index) | 93 | 100 |
| | tan δ (0° C.)/tan δ (60° C.) (index) | 103 | 100 |
| Unvulcanized compound viscosity | ML1 + 4 (100° C.) (index) | 74 | 100 |
| Scorch resistance | T5 125° C. (index) | 231 | 100 |

The results of Example 2-1 and Comparative Example 2-1 show that by using a silane coupling agent composition comprising the silane compound 1(VNB-SSi) and the silane compound 2(VNB-2SSi), the rubber composition comprising synthetic isoprene rubber had decreased viscosity of the unvulcanized compound and improved scorch resistance, and further had improved viscoelastic properties of the rubber sheet. Therefore, it was found that by using the silane coupling agent composition and rubber composition of the present invention, it is possible to produce a tire having improved workability of rubber and further having an excellent balance of wet grip performance and low-fuel consumption in terms of practical use.

The invention claimed is:

1. A silane coupling agent composition comprising a silane compound, wherein the silane compound comprises a first silane compound represented by the following Formula (1):

(1)

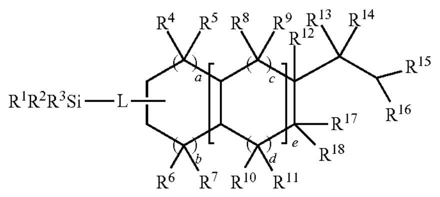

wherein $R^1$, $R^2$, and $R^3$ each independently represent a hydrocarbon group optionally containing an oxygen atom or a nitrogen atom, or a hydrogen atom;

L is a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms, and a second silane compound represented by the following Formula (11):

(11)

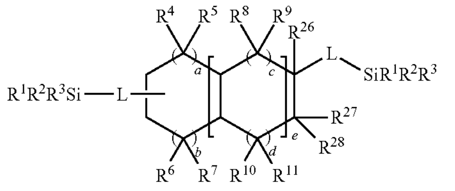

wherein $R^1$, $R^2$, and $R^3$ each independently represent a hydrocarbon group optionally containing an oxygen atom or a nitrogen atom, or a hydrogen atom;

L is independently a hydrocarbon group optionally containing at least one heteroatom selected from the group consisting of nitrogen, oxygen, and sulfur;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{26}$, $R^{27}$, and $R^{28}$ each independently represent a hydrogen atom, a methyl group, or an alkyl group having 2 to 10 carbon atoms.

2. The silane coupling agent composition according to claim 1, wherein the first silane compound is a compound represented by the following Formula (2):

(2)

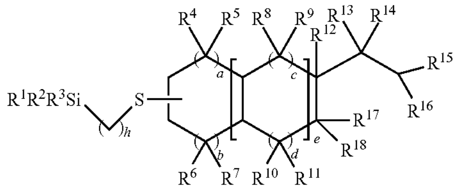

wherein $R^1$, $R^2$, and $R^3$ each independently represent a hydrocarbon group optionally containing an oxygen atom or a nitrogen atom, or a hydrogen atom;

h is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{16}$ is a hydrogen atom, a methyl group, or an alkyl group having 2 to 8 carbon atoms, while $R^{17}$ is a hydrogen atom, a methyl group, or an alkyl group having 2 to 10 carbon atoms, and at the same time, $R^{12}$ and $R^{13}$ combine with each other to form a double bond, while $R^{14}$, $R^{15}$, and $R^{18}$ are a hydrogen atom, a methyl group, or an alkyl group having 2 to 10 carbon atoms, or $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms;

or $R^{16}$ and $R^{17}$ optionally combine with each other to form a 4- to 9-membered alicyclic hydrocarbon, and at the same time, $R^{14}$ and $R^{15}$ combine with each other to form a double bond, while $R^{12}$, $R^{13}$, and $R^{18}$ are a hydrogen atom, a methyl group, or an alkyl group having 2 to 10 carbon atoms.

3. The silane coupling agent composition according to claim 1, wherein the second silane compound is a compound represented by the following Formula (12):

(12)

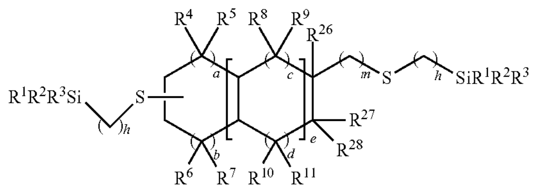

wherein $R^1$, $R^2$, and $R^3$ each independently represent a hydrocarbon group optionally containing an oxygen atom or a nitrogen atom, or a hydrogen atom;

h is an integer of 1 to 10;

m is an integer of 1 to 10;

a is an integer of 0 or 1;

b is an integer of 0 or 1;

c is independently an integer of 0 or 1;

d is independently an integer of 0 or 1;

e is an integer of 0 to 5;

$R^4$, $R^5$, $R^6$, and $R^7$ represent a hydrogen atom, a methyl group, or an alkyl group having 2 to 10 carbon atoms, or one of $R^4$ or $R^5$ and $R^6$ or $R^7$ optionally forms a crosslinked structure represented by $-(CH_2)_f-$;

f is an integer of 1 to 5;

$R^8$, $R^9$, $R^{10}$, and $R^{11}$ represent a hydrogen atom, a methyl group, or an alkyl group having 2 to 10 carbon atoms, or one of $R^8$ or $R^9$ and $R^{10}$ or $R^{11}$ optionally forms a crosslinked structure represented by $-(CH_2)_g-$;

g is an integer of 1 to 5; and $R^{26}$, $R^{27}$, and $R^{28}$ each independently represent a hydrogen atom, a methyl group, or an alkyl group having 2 to 10 carbon atoms.

4. The silane coupling agent composition according to claim 1, wherein a content of the second silane compound is from 1% to 50% by mass with respect to a total content of the first silane compound and the second silane compound.

5. The silane coupling agent composition according to claim 1, wherein the silane compound further comprises a different silane compound other than first silane compound and the second silane compound.

6. The silane coupling agent composition according to claim 5, wherein the different silane compound is a silane compound represented by the Formula (13):

(13)

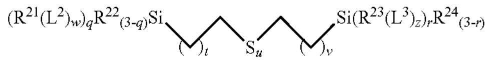

wherein t and v are each independently an integer of 0 to 10;

u is an integer of 2 to 10;

q and r are each independently an integer of 1 to 3;

w and z are each independently an integer of 0 or 1, $L^2$ and $L^3$ are each independently a hydrocarbon group optionally containing at least one heteroatom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently hydrogen or an alkyl group.

7. The silane coupling agent composition according to claim 1, which is used for a diene-based rubber.

8. A rubber composition comprising the silane coupling agent composition according to claim 1, a diene-based rubber, and silica, wherein a total content of the first silane compound and the second silane compound is from 0.5 to 30 parts by mass with respect to 100 parts by mass of the silica.

9. The rubber composition according to claim 8, wherein a content of the silica is from 0.5 to 300 parts by mass with respect to 100 parts by mass of the diene-based rubber.

10. The rubber composition according to claim 8, which is used for a tire.

11. A crosslinked product of the rubber composition according to claim 8.

12. A pneumatic tire in which the crosslinked product according to claim 11 is used for a tire tread.

* * * * *